US012764019B2

(12) United States Patent
Ishaq

(10) Patent No.: US 12,764,019 B2
(45) Date of Patent: Oct. 13, 2026

(54) INTEGRATED DATA PLATFORM FOR CONNECTING WORKSTREAMS

(71) Applicant: Boost SubscriberCo L.L.C., Englewood, CO (US)

(72) Inventor: Mian Rizwan Ishaq, Littleton, CO (US)

(73) Assignee: SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/830,470

(22) Filed: Sep. 10, 2024

(65) Prior Publication Data

US 2026/0074952 A1 Mar. 12, 2026

(51) Int. Cl.

*H04L 41/0631* (2022.01)
*H04L 41/082* (2022.01)
*H04L 41/22* (2022.01)

(52) U.S. Cl.

CPC ........ *H04L 41/082* (2013.01); *H04L 41/0631* (2013.01); *H04L 41/22* (2013.01)

(58) Field of Classification Search

None
See application file for complete search history.

(56) References Cited

U.S. PATENT DOCUMENTS 9,432,865 B1 * 8/2016 Jadunandan ............ H04L 43/08
11,144,853 B1 * 10/2021 Waterman ............... H04L 67/02
11,902,129 B1 * 2/2024 Augustin ............ H04L 43/0817
11,960,383 B2 * 4/2024 Gottlieb .............. G06F 11/3438
2009/0075663 A1 * 3/2009 Wilson .................... H04L 41/22 455/446
2013/0150116 A1 * 6/2013 Nakamura .......... H04W 52/242 455/522
2013/0246110 A1 * 9/2013 Nakhayi Ashtiani ........................ G06Q 30/0207 705/7.13
2014/0051451 A1 * 2/2014 Goldberg .............. H04W 16/24 455/446
2015/0358902 A1 * 12/2015 Edge ..................... H04W 48/16 370/328

(Continued)

FOREIGN PATENT DOCUMENTS

AU 2024219353 A1 9/2024
AU 2024259779 A1 11/2024

*Primary Examiner* — Joshua Joo
(74) *Attorney, Agent, or Firm* — Lowenstein Sandler LLP

(57) ABSTRACT

A method includes collecting data from a plurality of workstreams relating to maintaining, operating, or building a cellular network; storing the collected data in a centralized repository; and correlating the collected data from at least two workstreams of the plurality of workstreams. The plurality of workstreams include selection and/or installation of wireless sites, monitoring performance of the cellular network, monitoring user sessions on the cellular network, implementing software updates on the cellular network, and/or monitoring productivity of one or more employees of a provider of the cellular network. Correlating the collected data from the at least two workstreams of the plurality of workstreams includes correlating the collected data based on a common data field included in the collected data from each of the at least two workstreams. The method also includes presenting a user interface including a visualization of at least a portion of the correlated data.

20 Claims, 19 Drawing Sheets

(56) References Cited

U.S. PATENT DOCUMENTS

| | | | | |
|---|---|---|---|---|
| 2020/0371780 | A1* | 11/2020 | Sagy | G06F 11/3428 |
| 2022/0180290 | A1* | 6/2022 | Xin | G06N 3/04 |
| 2023/0090169 | A1* | 3/2023 | Mitcsenkov | H04L 43/08 455/423 |
| 2023/0239725 | A1* | 7/2023 | Wakim | H04W 28/0242 370/329 |
| 2023/0289691 | A1* | 9/2023 | Sabourin | G06Q 10/0639 |
| 2024/0179539 | A1* | 5/2024 | Sakamoto | H04L 41/149 |
| 2024/0241711 | A1* | 7/2024 | Baillargeon | G06F 8/65 |
| 2024/0378208 | A1 | 11/2024 | Zhou et al. | |
| 2024/0403156 | A1 | 12/2024 | Malboubi et al. | |
| 2025/0126023 | A1* | 4/2025 | Tang | H04L 41/122 |
| 2025/0298808 | A1* | 9/2025 | Bolognese | G06F 16/904 |

* cited by examiner

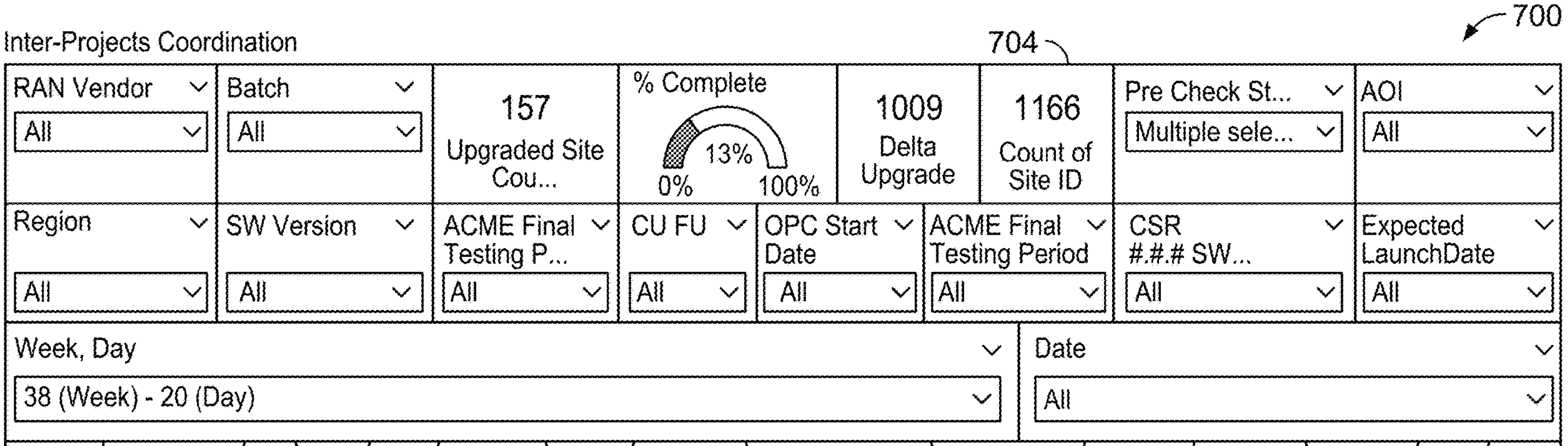

| Region | Market | AOI | Priority by RF | Count of Site ID | Upgraded Site Count | Delta Upgrade | Upgraded % | ACME Final Testing Period | CU FC | OPC Start Date | CSR #.#.2# SW Upgrade [FC] | First Expected Launch Date | | |
|---|---|---|---|---|---|---|---|---|---|---|---|---|---|---|
| Central | City 1 | XXX | 15 | 634 | 157 | 477 | 25% | Week 3 | MM/DD/YY | MM/DD/YY | MM/DD/YY | MM/DD/YY | | |
| Central | City 1 | XXX | 15 | 634 | 157 | 477 | 25% | Week 3 | MM/DD/YY | MM/DD/YY | MM/DD/YY | MM/DD/YY | | |
| Northeast | City 2 | YYY | 25 | 776 | 157 | 619 | 20% | Week 3 | MM/DD/YY | MM/DD/YY | MM/DD/YY | MM/DD/YY | | |
| Northeast | City 2 | YYY | 25 | 776 | 157 | 619 | 20% | Week 3 | MM/DD/YY | MM/DD/YY | MM/DD/YY | MM/DD/YY | | |
| Northeast | City 2 | YYY | 25 | 776 | 157 | 619 | 20% | Week 3 | MM/DD/YY | MM/DD/YY | MM/DD/YY | MM/DD/YY | | |
| South | City 3 | ZZZ | 29 | 644 | 157 | 487 | 24% | Week 2 | MM/DD/YY | MM/DD/YY | MM/DD/YY | MM/DD/YY | | |
| South | City 3 | ZZZ | 29 | 644 | 157 | 487 | 24% | Week 2 | MM/DD/YY | MM/DD/YY | MM/DD/YY | MM/DD/YY | | |
| South | City 2 | ZZZ | 29 | 644 | 157 | 487 | 24% | Week 2 | MM/DD/YY | MM/DD/YY | MM/DD/YY | MM/DD/YY | | |
| Central | City 4 | AAA | 55 | 519 | 157 | 362 | 30% | Week 2 | MM/DD/YY | MM/DD/YY | MM/DD/YY | MM/DD/YY | | |
| Total | | | | 1166 | 157 | 1009 | 13% | | | | | MM/DD/YY | | |

FIG. 7

800

Site Integration

808

| Priority (RVPs) | Phase | Buildplan Year | 7161 CX503 Site Acceptance | 7229 On Air Count | 7229 CX500 Integrated | 7619 TR0B2 CSR | 9268 TR0B0 Telco | 13K CS280 Power |
|---|---|---|---|---|---|---|---|---|
| 1 – 61 | All | All | | | | | | |

| City | Count of Site ID | Count of Buildplan Year | CX500 Integrated | Buildplan Year Count | Priority (RVPs) | % Buildplan |
|---|---|---|---|---|---|---|
| AAA | 103 | 103 | 38 | 103 | 50 | 37% |
| BBB | 61 | 61 | 25 | 61 | 10 | 41% |
| CCC | 1095 | 1095 | 30 | 1095 | 52 | 3% |
| DDD | 661 | 661 | 146 | 661 | 39 | 22% |
| EEE | 171 | 171 | 67 | 171 | 43 | 39% |
| FFF | 311 | 311 | 130 | 311 | 40 | 42% |
| GGG | 549 | 549 | 210 | 549 | 20 | 38% |
| HHH | 51 | 51 | 18 | 51 | 1 | 35% |
| III | 335 | 335 | 187 | 335 | 8 | 56% |
| Total | 26234 | 26234 | 7178 | 26234 | | 27% |

802

| Priority (RVPs) | City | Site ID | DU Drop | CX500 Integrated | CX503 Site Acceptance |
|---|---|---|---|---|---|
| 10 | AAA | Site ID 1 | Drop 22.2 | | 0 |
| 10 | AAA | Site ID 1 | No SW Ver Info | | 0 |
| 10 | AAA | Site ID 2 | Drop 22.2 | | 0 |
| 10 | AAA | Site ID 2 | No SW Ver Info | | 0 |
| 10 | AAA | Site ID 3 | Drop 22.2 | | 0 |
| 10 | AAA | Site ID 3 | No SW Ver Info | | 0 |
| 10 | AAA | Site ID 4 | Drop 22.2 | | 0 |
| 10 | AAA | Site ID 4 | No SW Ver Info | | 0 |
| 10 | AAA | Site ID 5 | Drop 22.2 | | 0 |
| 10 | AAA | Site ID 5 | No SW Ver Info | | 0 |
| 10 | AAA | Site ID 6 | Drop 22.2 | | 0 |
| 10 | AAA | Site ID 6 | No SW Ver Info | | 0 |
| 10 | AAA | Site ID 7 | Drop 22.2 | | 0 |
| 10 | AAA | Site ID 7 | No SW Ver Info | | 0 |
| 10 | AAA | Site ID 8 | Drop 22.2 | | 0 |
| 10 | AAA | Site ID 8 | No SW Ver Info | | 0 |
| 10 | AAA | Site ID 9 | Drop 22.2 | | 0 |
| 10 | AAA | Site ID 9 | No SW Ver Info | | 0 |
| 10 | AAA | Site ID 10 | Drop 22.2 | | 0 |
| 10 | AAA | Site ID 10 | No SW Ver Info | | 0 |
| 10 | AAA | Site ID 11 | Drop 22.2 | | 0 |
| Total | | | | 7229 | 7161 |

CX500 Integrated by Market and City

City AAA BBB CCC DDD EEE FFF GGG HHH III JJJ KKK LLL MMM NNN OOO PPP QQQ RRR SSS TTT UUU

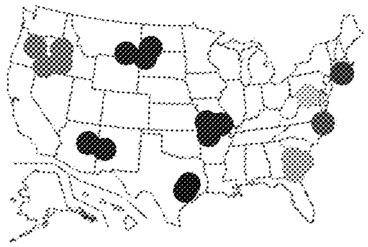

804

806

FIG. 8

| City | Count of Site ID | Count of Buildplan Year | CX500 Integrated | Buildplan Year Count | Priority (RVPs) | % Buildplan |
|---|---|---|---|---|---|---|
| AAA | 51 | 51 | 18 | 51 | 1 | 35% |
| BBB | 13 | 13 | 10 | 13 | 2 | 77% |
| CCC | 732 | 732 | 486 | 732 | 3 | 66% |
| DDD | 864 | 864 | 396 | 864 | 4 | 46% |
| Total | 2793 | 2793 | 1561 | 2793 | | 56% |

| Site ID / DU ID | First DU Drop |
|---|---|
| Site ID 1 | Drop 22.2 |
| Site ID 2 | Drop 22.2 |
| Site ID 3 | Drop 22.2 |
| Site ID 4 | Drop 22.2 |
| Site ID 5 | Drop 22.2 |
| Site ID 6 | Drop 22.2 |
| Site ID 7 | Drop 22.2 |
| Site ID 8 | Drop 22.2 |
| Site ID 9 | Drop 22.2 |
| Site ID 10 | Drop 22.2 |

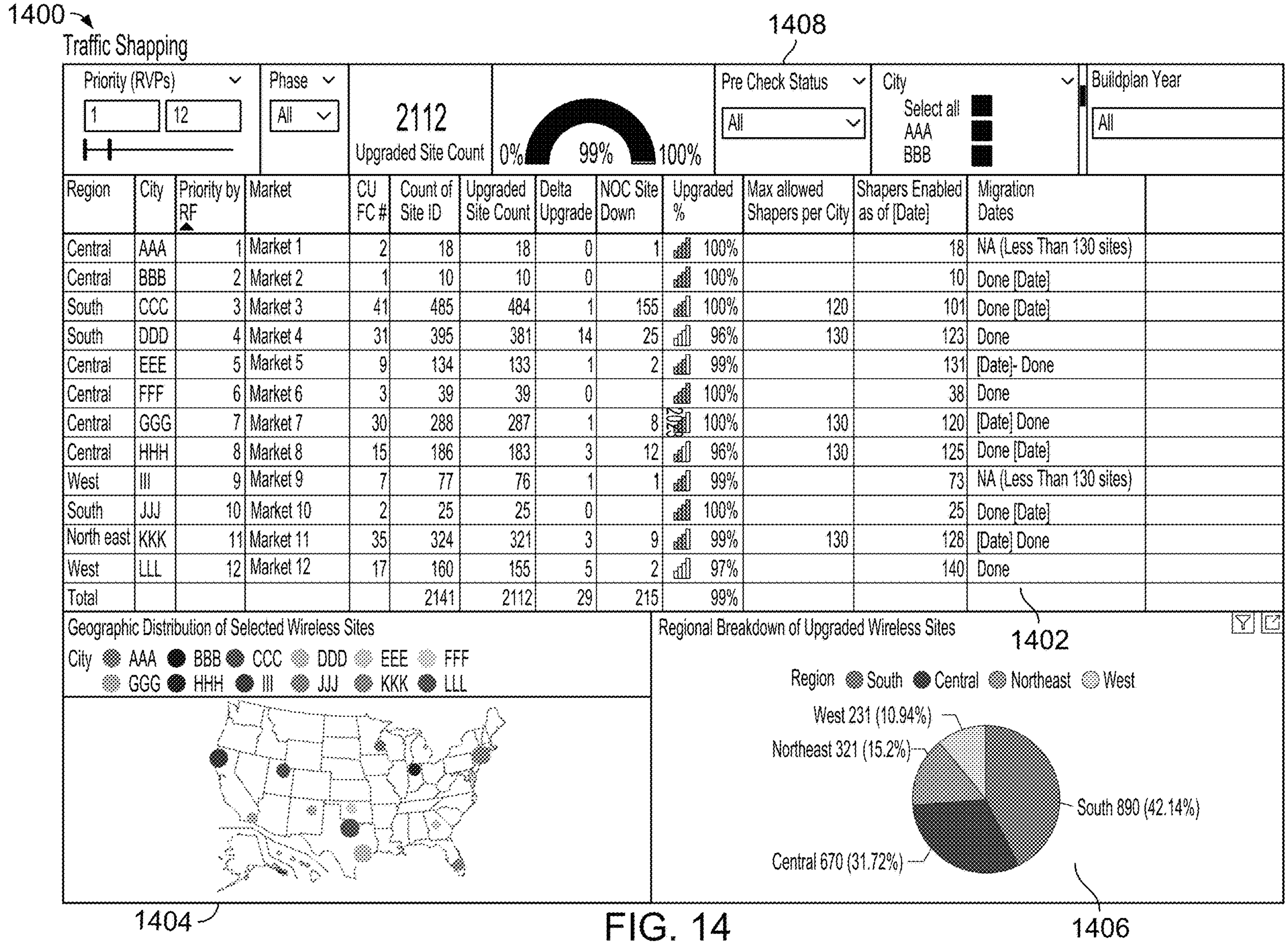

| Region | City | Priority by RF | Market | CU FC # | Count of Site ID | Upgraded Site Count | Delta Upgrade | NOC Site Down | Upgraded % | Max allowed Shapers per City | Shapers Enabled as of [Date] | Migration Dates |
|---|---|---|---|---|---|---|---|---|---|---|---|---|
| Central | AAA | 1 | Market 1 | 2 | 18 | 18 | 0 | 1 | 100% | | 18 | NA (Less Than 130 sites) |
| Central | BBB | 2 | Market 2 | 1 | 10 | 10 | 0 | | 100% | | 10 | Done [Date] |
| South | CCC | 3 | Market 3 | 41 | 485 | 484 | 1 | 155 | 100% | 120 | 101 | Done [Date] |
| South | DDD | 4 | Market 4 | 31 | 395 | 381 | 14 | 25 | 96% | 130 | 123 | Done |
| Central | EEE | 5 | Market 5 | 9 | 134 | 133 | 1 | 2 | 99% | | 131 | [Date]- Done |
| Central | FFF | 6 | Market 6 | 3 | 39 | 39 | 0 | | 100% | | 38 | Done |
| Central | GGG | 7 | Market 7 | 30 | 288 | 287 | 1 | 8 | 100% | 130 | 120 | [Date] Done |
| Central | HHH | 8 | Market 8 | 15 | 186 | 183 | 3 | 12 | 96% | 130 | 125 | Done [Date] |
| West | III | 9 | Market 9 | 7 | 77 | 76 | 1 | 1 | 99% | | 73 | NA (Less Than 130 sites) |
| South | JJJ | 10 | Market 10 | 2 | 25 | 25 | 0 | | 100% | | 25 | Done [Date] |
| North east | KKK | 11 | Market 11 | 35 | 324 | 321 | 3 | 9 | 99% | 130 | 128 | [Date] Done |
| West | LLL | 12 | Market 12 | 17 | 160 | 155 | 5 | 2 | 97% | | 140 | Done |
| Total | | | | | 2141 | 2112 | 29 | 215 | 99% | | | |

FIG. 14

INTEGRATED DATA PLATFORM FOR CONNECTING WORKSTREAMS

TECHNICAL FIELD

The description generally relates to techniques for connecting data relating to separate workstreams (e.g., data used and/or produced by separate verticals or departments of an organization) using an integrated data platform, and applications thereof.

BACKGROUND

Cellular networks (e.g., cellular radio access networks, cellular core networks, etc.) are telecommunications networks that include a number of distributed devices that send, receive, and/or process wireless signals across the network to provide coverage to a geographical area. To maintain, operate, and build cellular networks, providers of cellular networks often use, generate, and collect data relating to many different workstreams. Examples of cellular network-related workstreams include selection and installation of wireless sites, monitoring network performance, monitoring user session data (e.g., locations and dropped calls), rolling out software updates on the network, monitoring employee productivity, etc.

SUMMARY

This document describes techniques for connecting data relating to various workstreams in an integrated data platform, with particular focus on workstreams relevant to the maintenance, operation, and building of cellular networks (i.e., “cellular network-related workstreams”).

In one aspect, a method is featured. The method includes collecting data from a plurality of workstreams relating to maintaining, operating, or building a cellular network; storing the collected data in a centralized repository; and correlating the collected data from at least two workstreams of the plurality of workstreams. The plurality of workstreams include selection and/or installation of wireless sites, monitoring performance of the cellular network, monitoring user sessions on the cellular network, implementing software updates on the cellular network, and/or monitoring productivity of one or more employees of a provider of the cellular network. Correlating the collected data from the at least two workstreams of the plurality of workstreams includes correlating the collected data based on a common data field included in the collected data from each of the at least two workstreams. The method also includes presenting, on a display of a user device, a user interface including a visualization of at least a portion of the correlated data.

Implementations can include the examples described below and herein elsewhere. In some implementations, the centralized repository can include a data lake. In some implementations, the common data field can include a wireless site identifier. In some implementations, presenting the user interface can include receiving a user selection of one or more data fields, and determining, based on the user selection, a type of the visualization for presenting on the display. In some implementations, the correlated data can include user session data and network health data, and the method can further include determining, based on the visualization, a reason that a particular call was dropped. In some implementations, the correlated data can include information about a plurality of software versions implemented on the cellular network and one or more network performance indicators. The visualization can show the one or more network performance indicators for each of the plurality of software versions, and the method can further include comparing the performance of one software version of the plurality of software versions with another software version of the plurality of software versions. In some implementations, the correlated data can include information about the productivity of staff members, and the visualization can show the utilization rates of the staff members. The method can further include automatically presenting, on the display of the user device, an alert that the utilization rates of the staff members have fallen below a pre-defined threshold level. In some implementations, the correlated data can include information about a rollout of a software upgrade on the cellular network, and the visualization can show an indicator of progress of the rollout of the software upgrade on the cellular network. The method can further include automatically presenting, on the display of the user device, an alert that the rollout of the software upgrade on the cellular network is behind a planned timeline for the rollout of the software upgrade on the cellular network. In some implementations, the correlated data can include information about a development status of a wireless site being developed for integration into the cellular network, and the visualization can show an indicator of the development status. The method can further include automatically determining that the development status of the wireless site has progressed to a certain stage, and in response to determining that the development status of the wireless site has progressed to the certain stage, presenting on the display of the user device a recommendation to transmit a communication to an identified party to initiate a subsequent stage of wireless site development. In some implementations, the correlated data can include information about one or more versions of software being implemented across the cellular network, and the visualization can show an indicator of the one or more versions of software being implemented across the cellular network. The method can further include automatically presenting, on the display of the user device, an alert that a predominant software version of the one or more versions of software being implemented across the cellular network is implemented in a percentage of wireless sites of the cellular network that is below a pre-defined threshold. In some implementations, the correlated data can include information about one or more wireless sites of the cellular network, and the visualization can show an indicator of performance characteristics and/or failure reasons of the one or more wireless sites of the cellular network. In some implementations, the one or more wireless sites of the cellular network can be dark sites of the cellular network. In some implementations, the method can further include automatically presenting, on the display of the user device, an alert that a number or proportion of the one or more wireless sites that are down has exceeded a pre-defined threshold level. In some implementations, the correlated data can include information about one or more wireless sites of the cellular network and one or more computer clusters, and the visualization can show an indication of which of the one or more computer clusters are utilized by each of the one or more wireless sites of the cellular network. In some implementations, the correlated data can include information about one or more wireless sites of the cellular network and a progress of a traffic shaping upgrade for the one or more wireless sites; and the visualization can show an indicator of the progress of the traffic shaping upgrade for one or more geographic areas. In some implementations, the correlated data can include information about performance characteristics and locations of one or more wireless sites of the cellular network, and the visualization can show an indicator of progress for a performance-related optimization process for the one or more wireless sites. The method can further include automatically presenting, on the display of the user device, an indication that a percentage of the one or more wireless sites of the cellular network that have been optimized exceeds a pre-defined threshold. In some implementations, the correlated data can include information about server models utilized at one or more wireless sites of the cellular network, and the visualization can show an indicator of progress for a server swapping process for the one or more wireless sites. The method can further include automatically presenting, on the display of the user device, an indication that a percentage of the one or more wireless sites where a server swap has been completed exceeds a predefined threshold. In some implementations, the correlated data can include information about one or more defects associated with vendor-provided software and/or hardware that is deployed on the cellular network; and the visualization can show an indication of a status of the one or more defects associated with the vendor-provided software and/or hardware that is deployed on the cellular network.

In another aspect a computing system is featured. The computing system includes a centralized data repository that stores data from a plurality of workstreams relating to maintaining, operating, or building a cellular network; a user device including a display; a memory configured to store instructions; and one or more processors configured to execute the instructions to perform operations. The plurality of workstreams include selection and/or installation of wireless sites, monitoring performance of the cellular network, monitoring user sessions on the cellular network, implementing software updates on the cellular network, and/or monitoring productivity of one or more employees of a provider of the cellular network. The operations performed include correlating the collected data from at least two workstreams of the plurality of workstreams, and presenting, on the display of the user device, a user interface comprising a visualization of at least a portion of the correlated data. Correlating the collected data from the at least two workstreams of the plurality of workstreams includes correlating the collected data based on a common data field included in the collected data from each of the at least two workstreams.

Implementations can include the examples described below and herein elsewhere. In some implementations, the centralized repository can include a data lake. In some implementations, the common data field can include a wireless site identifier. In some implementations, presenting the user interface can include receiving a user selection of one or more data fields, and determining, based on the user selection, a type of the visualization for presenting on the display. In some implementations, the correlated data can include user session data and network health data, and the operations can further include determining, based on the visualization, a reason that a particular call was dropped. In some implementations, the correlated data can include information about a plurality of software versions implemented on the cellular network and one or more network performance indicators. The visualization can show the one or more network performance indicators for each of the plurality of software versions, and the operations can further include comparing the performance of one software version of the plurality of software versions with another software version of the plurality of software versions. In some implementations, the correlated data can include information about the productivity of staff members, and the visualization can show the utilization rates of the staff members. The operations can further include automatically presenting, on the display of the user device, an alert that the utilization rates of the staff members have fallen below a pre-defined threshold level. In some implementations, the correlated data can include information about a rollout of a software upgrade on the cellular network, and the visualization can show an indicator of progress of the rollout of the software upgrade on the cellular network. The operations can further include automatically presenting, on the display of the user device, an alert that the rollout of the software upgrade on the cellular network is behind a planned timeline for the rollout of the software upgrade on the cellular network. In some implementations, the correlated data can include information about a development status of a wireless site being developed for integration into the cellular network, and the visualization can show an indicator of the development status. The operations can further include automatically determining that the development status of the wireless site has progressed to a certain stage, and in response to determining that the development status of the wireless site has progressed to the certain stage, presenting on the display of the user device a recommendation to transmit a communication to an identified party to initiate a subsequent stage of wireless site development. In some implementations, the correlated data can include information about one or more versions of software being implemented across the cellular network, and the visualization can show an indicator of the one or more versions of software being implemented across the cellular network. The operations can further include automatically presenting, on the display of the user device, an alert that a predominant software version of the one or more versions of software being implemented across the cellular network is implemented in a percentage of wireless sites of the cellular network that is below a pre-defined threshold. In some implementations, the correlated data can include information about one or more wireless sites of the cellular network, and the visualization can show an indicator of performance characteristics and/or failure reasons of the one or more wireless sites of the cellular network. In some implementations, the one or more wireless sites of the cellular network can be dark sites of the cellular network. In some implementations, the operations can further include automatically presenting, on the display of the user device, an alert that a number or proportion of the one or more wireless sites that are down has exceeded a pre-defined threshold level. In some implementations, the correlated data can include information about one or more wireless sites of the cellular network and one or more computer clusters, and the visualization can show an indication of which of the one or more computer clusters are utilized by each of the one or more wireless sites of the cellular network. In some implementations, the correlated data can include information about one or more wireless sites of the cellular network and a progress of a traffic shaping upgrade for the one or more wireless sites; and the visualization can show an indicator of the progress of the traffic shaping upgrade for one or more geographic areas. In some implementations, the correlated data can include information about performance characteristics and locations of one or more wireless sites of the cellular network, and the visualization can show an indicator of progress for a performance-related optimization process for the one or more wireless sites. The operations can further include automatically presenting, on the display of the user device, an indication that a percentage of the one or more wireless sites of the cellular network that have been optimized exceeds a pre-defined threshold. In some implementations, the correlated data can include information about server models utilized at one or more wireless sites of the cellular network, and the visualization can show an indicator of progress for a server swapping process for the one or more wireless sites. The operations can further include automatically presenting, on the display of the user device, an indication that a percentage of the one or more wireless sites where a server swap has been completed exceeds a pre-defined threshold. In some implementations, the correlated data can include information about one or more defects associated with vendor-provided software and/or hardware that is deployed on the cellular network; and the visualization can show an indication of a status of the one or more defects associated with the vendor-provided software and/or hardware that is deployed on the cellular network.

Various implementations of the technology described herein may provide one or more of the following advantages. By connecting data from multiple workstreams in an integrated data platform, members of an organization (e.g., a cellular network provider) can make more efficient, educated, and calculated decisions compared to relying on data siloed in isolated data stores within separate verticals or departments of the organization. This efficient decision making can lead to enormous savings of time and cost for the organization, and can enable processes that would not be technologically feasible without connecting the data from multiple workstreams in the integrated data platform. For example, by connecting user session data (e.g., tower connection data, location data, call logs, etc.) with network data (e.g., tower locations, signal strength, down-times, tower technology type, operator, fiber type, etc.), the integrated data platform can be used to address customer complaints in real-time, allowing rapid investigations into the reason(s) a particular phone call was dropped. In another example, by connecting network data (e.g., a technology mode implemented on particular towers, down-times, etc.) with network performance data (e.g., throughput data, signal to interference plus noise ratios (SINRs), received signal strength indicators, etc.), the integrated data platform can enable direct comparisons between different versions of software that may be rolled out on the cellular network. In additional examples, the integrated data platform can be used to provide useful data dashboards for rapidly monitoring the status of a software upgrade rollout across the cellular network, network health status, hardware installations (e.g., server installations or wireless tower construction projects), employee productivity across the organization, etc.

The technologies described herein can be especially relevant for cloud-native 5G networks (as compared to other kinds of cellular networks) since the data collected from various cellular network-related workstreams for a cloud-native 5G network are already stored in the cloud. Compared to traditional network infrastructures in which different kinds of data are typically siloed from one another, the natural data infrastructure of cloud-native 5G networks can have the advantage of more readily lending itself to connecting data related to various workstreams, thereby enabling the integrated data platform and related technologies described herein.

Other features and advantages of the description will become apparent from the following description, and from the claims. Unless otherwise defined, the technical and scientific terms used herein have the same meaning as commonly understood by one of ordinary skill in the art to which this invention belongs.

BRIEF DESCRIPTION OF DRAWINGS

FIGS. 3-18 show example user interfaces that include data visualizations generated using an integrated data platform.

DETAILED DESCRIPTION

The maintenance, operation, and construction of cellular networks is a complex undertaking that involves many different groups of interrelated tasks/processes (sometimes referred to as "workstreams") including, for example, the selection and installation of wireless sites, network performance monitoring, user session data monitoring, software and/or hardware upgrades, employee productivity monitoring, etc. Large amounts of data are used, generated, and collected in relation to each of these workstreams, with the complexity of data management increasing as the cellular network expands.

To conduct and manage these workstreams (and their associated complexities), cellular network providers often employ separate departments or verticals within their organizations to handle different workstreams. One challenge of this approach, however, is that the data used, generated, and collected in relation to one workstream (e.g., by one department or vertical within an organization) can become siloed from the data used, generated, and collected in relation to another workstream (e.g., by another department or vertical within the organization). This technical limitation on the accessibility of data across the cellular network provider's organization can inhibit the cellular network provider's ability to make efficient, educated, and data-driven decisions.

The challenges described above have historically been exacerbated by traditional cellular network infrastructures, which lend themselves to the storage of data from different workstreams in isolated data stores. However, with the rise of core-native cellular networks (e.g., cloud-native 5G networks), much of the workstream-related data collected from these networks exists in the cloud, enabling new opportunities for utilizing centralized repositories such as data lakes and connecting/correlating data across different departments/verticals of an organization. Accordingly, this document describes, among other things, the connection/correlation of different workstream-related datasets to create an integrated data platform that provides substantial technical advantages for accessing and analyzing data from various cellular network-related workstreams within an organization. While the integrated data platform and related technologies described herein are especially well-suited for cloud-native 5G networks and are thus described in relation to cloud-native 5G networks for illustrative purposes, it is recognized that these technologies can also be implemented to improve the maintenance, operation, and construction of other kinds of cellular networks as well (e.g., 3G networks, 4G networks, non-cloud-native networks, etc.).

Figure 1:
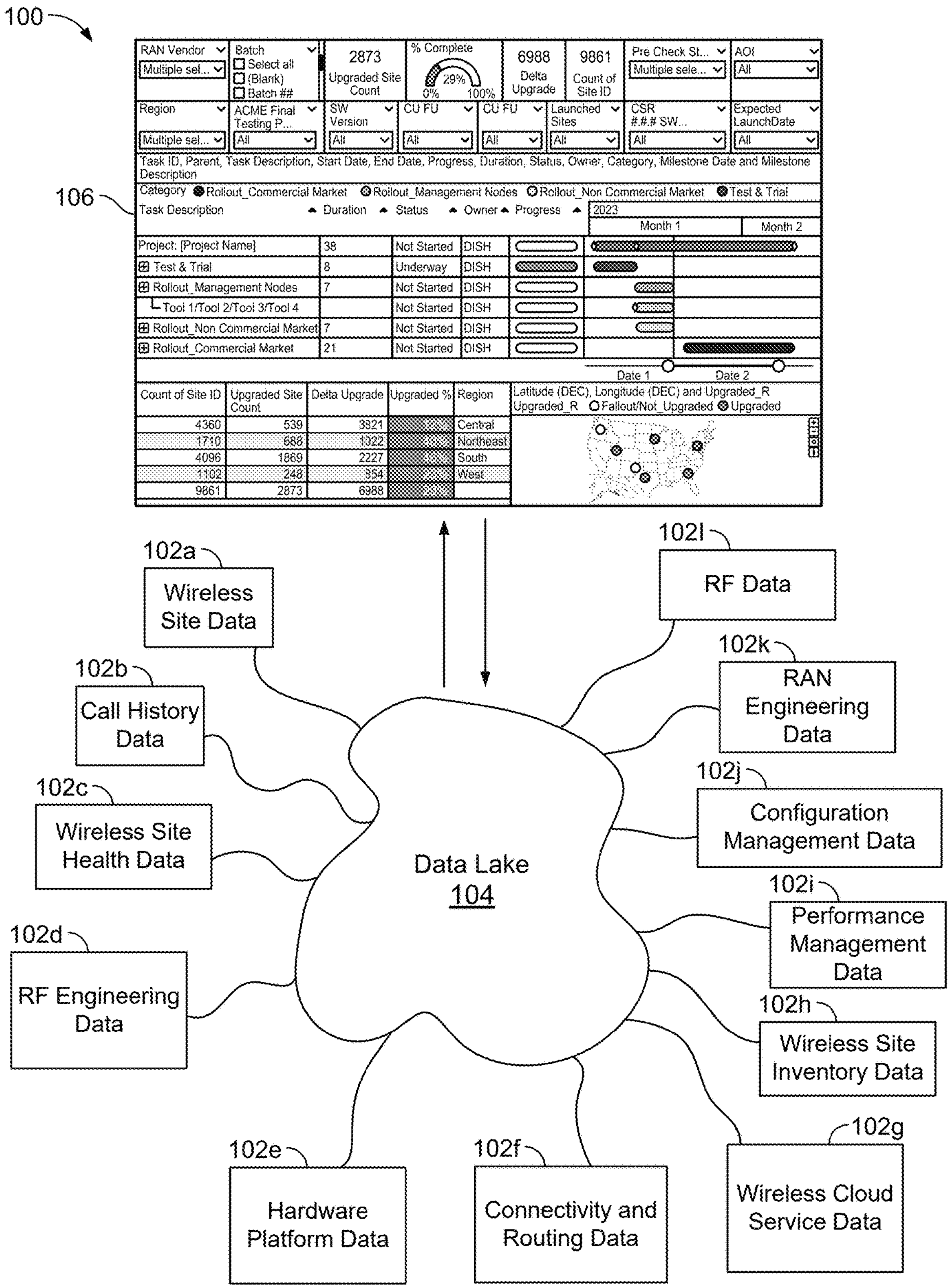
FIG. 1 is a diagram showing an integrated data platform.

FIG. 1 shows an example integrated data platform 100. The integrated data platform 100 includes a data lake 104, which includes workstream-related datasets 102*a*-102*l* associated with various verticals of a cellular network provider organization that have all been connected (or "correlated") with one another. For example, dataset 102*a* includes data about different wireless sites (e.g., sites where wireless equipment is deployed) including the locations of wireless sites, the height of the wireless sites, the kind of wireless equipment deployed at the sites (e.g., antenna type), etc. Dataset 102*b* includes data about call histories for user devices including the times that calls were made, the duration of the calls, if and when the calls were dropped, etc. Dataset 102*c* includes data about the health status of wireless sites in the network, including whether or not each site is partially or fully down. Dataset 102*d* includes data about the radio frequency (RF) engineering-related parameters that can be used in each wireless site (e.g., video frequency parameters). Dataset 102*e* includes data about the specific hardware platforms on which the software deployed on the cellular network runs. For example, the data in dataset 102*e* could indicate that the wireless sites in a particular geographic region are connected to a particular data center or server. Dataset 102*f* includes data about the connectivity and routing of devices on the cellular network including IP addresses. Dataset 102*g* includes data about the interface of the cellular network with external cloud platforms (e.g., Amazon Web Services (AWS), VMware Cloud, etc.). Dataset 102*h* includes data about the overall inventory of wireless sites in the cellular network. For example, the dataset 102*h* can include an aggregation of data from datasets 102*a*, 102*b*, 102*c*, and 102*e*. Dataset 102*i* includes performance management data including key performance indicators (KPIs) for the cellular network such as metrics of signal strength, signal quality, throughput, accessibility of the network, dropped calls, etc. Dataset 102*j* includes data about the configuration of the cellular network at any particular time including the parameters that are currently being used for the cellular network. Dataset 102*k* includes data about a radio access network (RAN) component of the overall cellular network (e.g., engineering-related parameters for the RAN, wireless site locations, wireless site health, etc.). Dataset 102*l* includes technical data about each wireless site in the cellular network such as the particular frequency bands that are being used, the width of those frequency bands, etc.

The workstream-related datasets 102*a*-102*l* associated with different verticals of the cellular network provider organization are correlated with one another based on common data fields that are found in the datasets 102*a*-102*l*. For example, multiple of the datasets 102*a*-102*l* may include a data field for a wireless site identifier (e.g., a unique ID code associated with a particular wireless site). This allows, as an example, the dataset 102*a* (which includes the physical locations of wireless sites) to be correlated to the dataset 102*c* (which includes health status of the very same wireless sites) so that a geographic analysis of wireless site health can be performed across the cellular network. In other cases, other common data fields can be used to connect datasets associated with different verticals. For example, for employee productivity monitoring, data about employees collected from one vertical can be associated with additional data about the same employees collected from another vertical based on a common data field such as an employee identifier (e.g., an employee ID number, an employee name, etc.).

Once the datasets 102*a*-102*l* have been correlated and stored in the data lake 104, the data can be accessed to create various user interfaces (e.g., user interface 106) that can be presented to a user (e.g., an employee of the cellular network provider) on a display of a computing device. The user interface 106 can include one or more data visualizations that are generated using any of the correlated data that exists across the organization—a result that was not technically feasible using the disconnected data infrastructures of previous cellular networks. In this way, the integrated data platform 100 yields substantial improvements to the kinds of analyses that can be performed to make more efficient, educated, and calculated decisions for maintaining, operating, and/or constructing the cellular network. Example user interfaces and corresponding applications are described in greater detail in relation to FIGS. 3-18 below.

Figure 2:
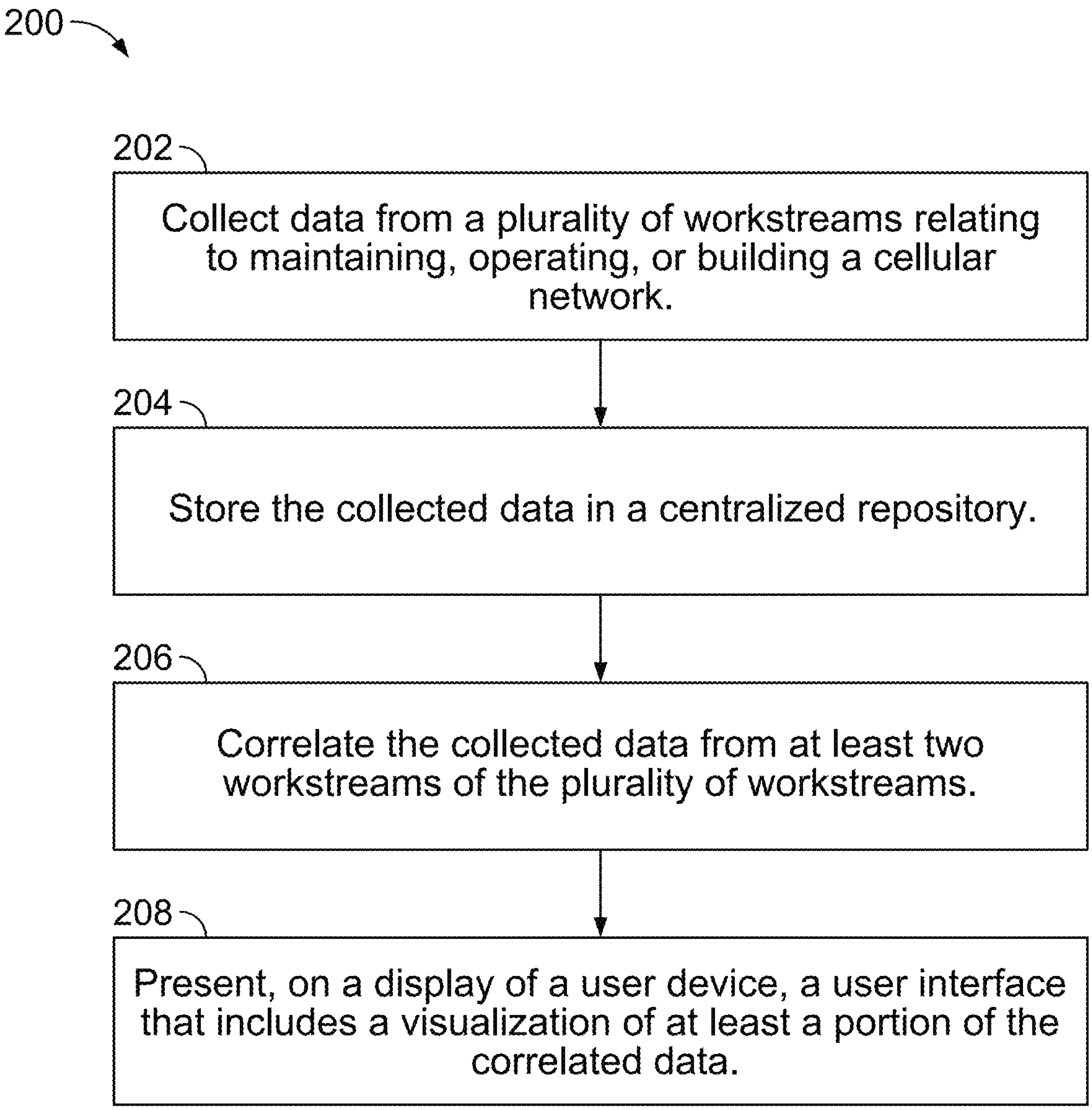
FIG. 2 is a flowchart showing a process for using an integrated data platform to present a user interface that includes a data visualization.

FIG. 2 shows a process 200 for using an integrated data platform (e.g., the integrated data platform 100 shown in FIG. 1) to present a user interface (e.g., user interface 106) that includes a data visualization. Operations of the process 200 include collecting data from a plurality of workstreams relating to maintaining, operating, or building a cellular network (operation 202). For example, these workstreams may be associated with the various verticals of a cellular network provider organization, as described above. In some implementations, the workstreams can include selection and/or installation of wireless sites, monitoring performance of the cellular network, monitoring user sessions on the cellular network, implementing software updates on the cellular network, and/or monitoring productivity of one or more employees of a provider of the cellular network. The data collected from these workstreams can correspond, for example, to the datasets 102*a*-102*l* described in relation to FIG. 1.

Operations of the process 200 also include storing the collected data in a centralized repository (operation 204). For example, the centralized repository can be a data lake such as the data lake 104 described in relation to FIG. 1. Operations of the process 200 also include correlating the collected data from at least two workstreams of the plurality of workstreams (operation 206). As described above, correlating the collected data from the at least two workstreams of the plurality of workstreams can include correlating the collected data based on a common data field (e.g., a wireless site identifier, an employee identifier, etc.) included in the collected data from each of the at least two workstreams.

Operations of the process 200 also include presenting, on a display of a user device, a user interface comprising a visualization of at least a portion of the correlated data (operation 208). For example, the user interface can correspond to the user interface 106 shown in FIG. 1 or the various user interfaces (300, 400, 500, 600, 700, 800, 900, 1000, 1100, 1200, 1300, 1400, 1500, 1600, 1700, 1800) shown in FIGS. 3-18, which are described in greater detail below. In some implementations, presenting the user interface can include receiving a user selection of one or more data fields to show on the user interface, and determining, based on the user selection, a type of visualization (e.g., a map, a bar graph, a scatter plot, a table, etc.) that would be most appropriate to present on the display. In some implementations, user interface defaults or templates can be created and saved for particular tasks such as those described herein. In this manner, users can benefit from a pre-designed user interface that already includes most, if not all, of the data visualizations that a user may be interested in analyzing for a specific task.

The process 200 can also include additional operations not shown in FIG. 2, but described in relation to the various applications discussed below in relation to FIGS. 3-18. In general, these operations can include receiving additional user input through the user interface, automating analyses for decision-making and issue identification purposes, generating recommendations for user action, etc.

FIGS. 3-18 show example user interfaces that include data visualizations generated using an integrated data platform (e.g., integrated data platform 100). As described herein, these user interfaces can be designed to assist a user with performing specific tasks related to the maintenance, operation, or construction of a cellular network, enabling more efficient, educated, and calculated decisions.

Figure 3:
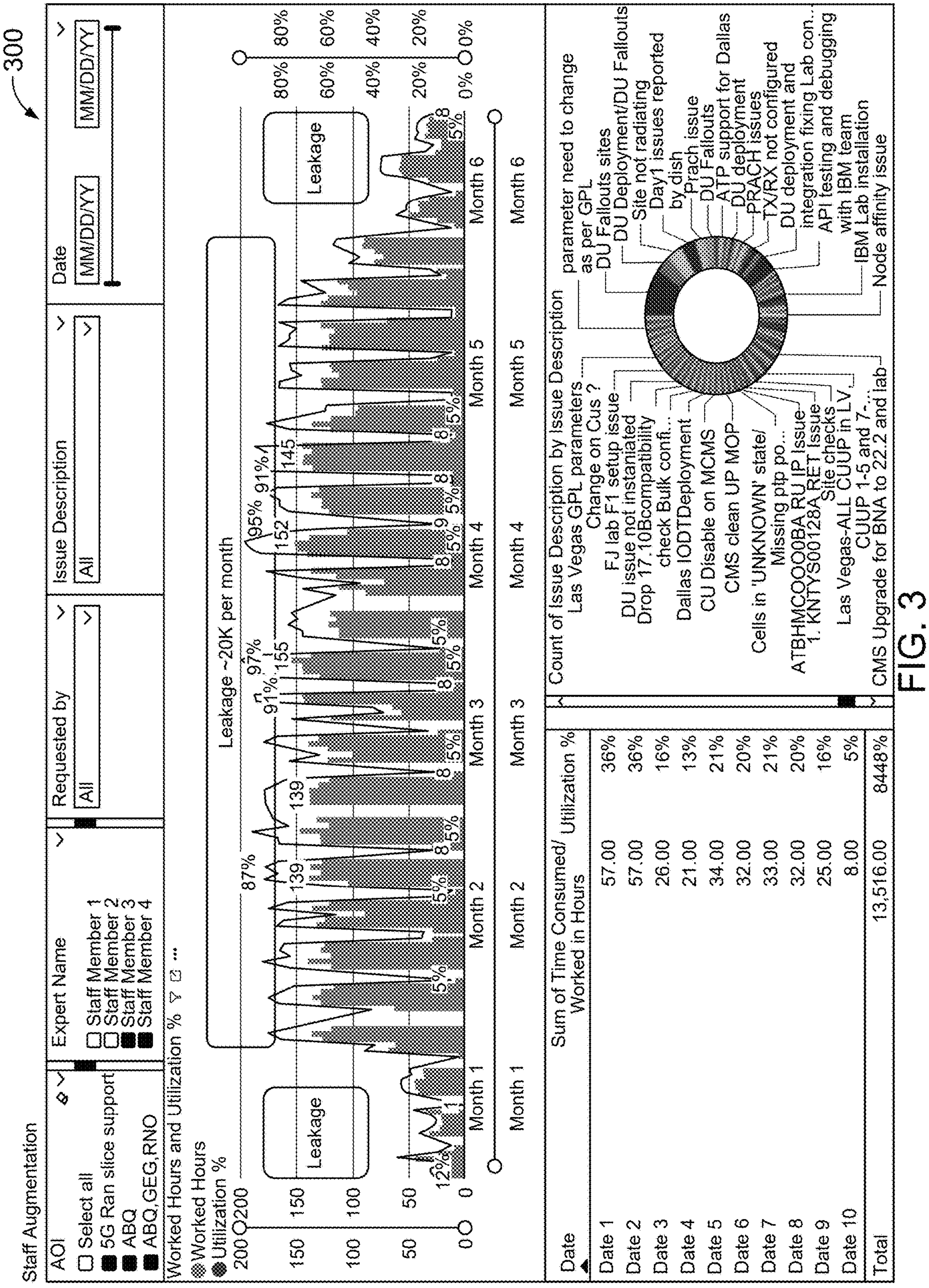

FIG. 3 shows a user interface 300 that can be particularly helpful for staff augmentation. For example, timesheets from employees or contractors from third parties can be stored in a centralized repository such as the data lake 104 and correlated with other collected data to analyze staff productivity. The user interface 300 includes a visualization that shows hours worked and utilization rates over time for selected staff members (e.g., employees or contractors). The user interface 300 also includes a table that shows, for each date, a total number of hours worked and overall utilization rate for the selected staff members. The user interface 300 further includes a pie chart that shows a breakdown of the issues worked on by the selected staff members. The user interface 300 further includes a menu including user-selectable options for selecting certain staff members, dates, and/or issue types of interest. The visualizations of the user interface 300 can be dynamically updated to reflect the selected user-selectable options. By analyzing these visualizations, a user can identify lost utilization or "leakage," which can be used to augment staff productivity and the efficient use of labor resources. A user may also identify a type of issue that has been taking a disproportionate amount of staff members'time to generate recommendations for time-saving measures. In some implementations, certain analyses can be performed automatically by a computing device (e.g., the user's device, a computing device owned by the cellular network provider, a remote cloud-based server, etc.). For example, if utilization rates fall below a pre-defined threshold level or vary substantially from historical rates, an alert can be automatically sent to a user and/or displayed on the user interface 300. In some implementations, the computing device can also generate recommendations or action items for a user that can be presented on the user interface. For example, the computing device can generate recommendations for streamlining particular tasks that take up a disproportionate amount of staff members'time. These generated recommendations can be presented on the user interface 300.

Figure 4:
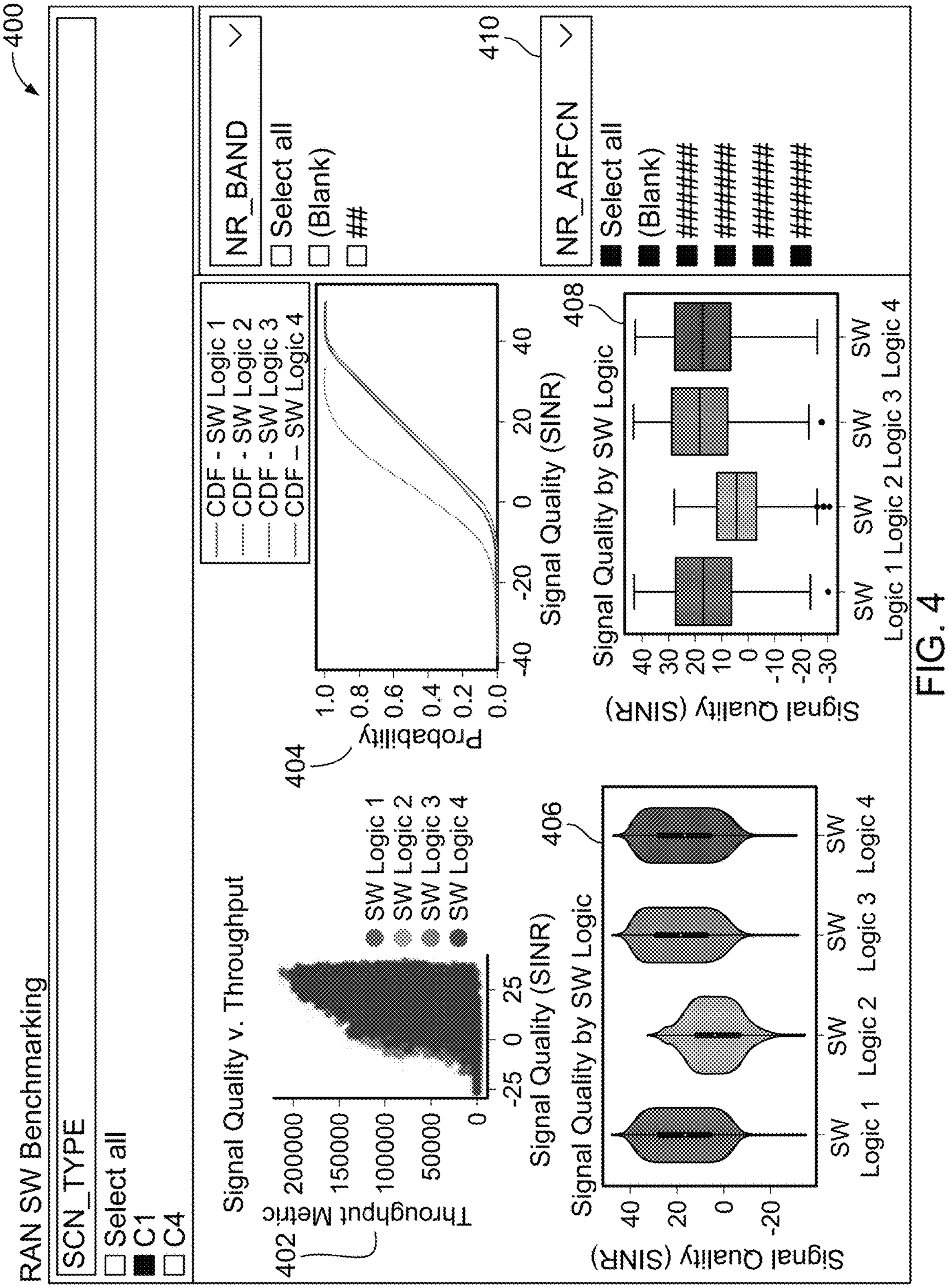

FIG. 4 shows a user interface 400 that can be particularly helpful for evaluating the performance of different software logics (e.g., different versions of software), a process sometimes referred to as "software benchmarking." Software benchmarking can be performed, for example, to assess whether a new version of software should be implemented across a cellular network and/or to identify issues with the new version of software. The user interface 400 displays information about the signal quality (e.g., signal to interference and noise ratio [SINR]) of user device connections to wireless equipment of the cellular network using different software logics. Visualization 402 of the user interface 400 shows, for four different software logics, a scatterplot of SINR and a metric of throughput (e.g., data speeds). Visualization 404 of the user interface 400 shows a cumulative probability distribution of SINRs for the same four software logics. Visualizations 406 and 408 of the user interface 400 show a violin plot and a box-and-whisker plot, respectively, of the SINRs for the same four software logics. The user interface 400 further includes a menu 410 that includes multiple user-selectable options corresponding to different software logics. The visualizations of the user interface 400 can be dynamically updated to reflect the selected user-selectable options. By analyzing these visualizations, a user can compare the performance of software logics to determine which software logic, if any, to implement across the cellular network. A user may also identify performance issues associated with a particular software logic to generate recommendations for features that should be fixed or improved. In some implementations, certain analyses can be performed automatically by a computing device (e.g., the user's device, a computing device owned by the cellular network provider, a remote cloud-based server, etc.). For example, a software logic can be automatically selected (or rejected) for broader implementation on a cellular network based on pre-defined thresholds of performance metrics (e.g., SINR, throughput metrics, etc.). In some implementations, the computing device can also generate recommendations or action items for a user that can be presented on the user interface. For example, the computing device can generate recommendations for improving or fixing particular features of a software logic to improve its performance characteristics. These generated recommendations can be presented on the user interface 400.

Figure 5:
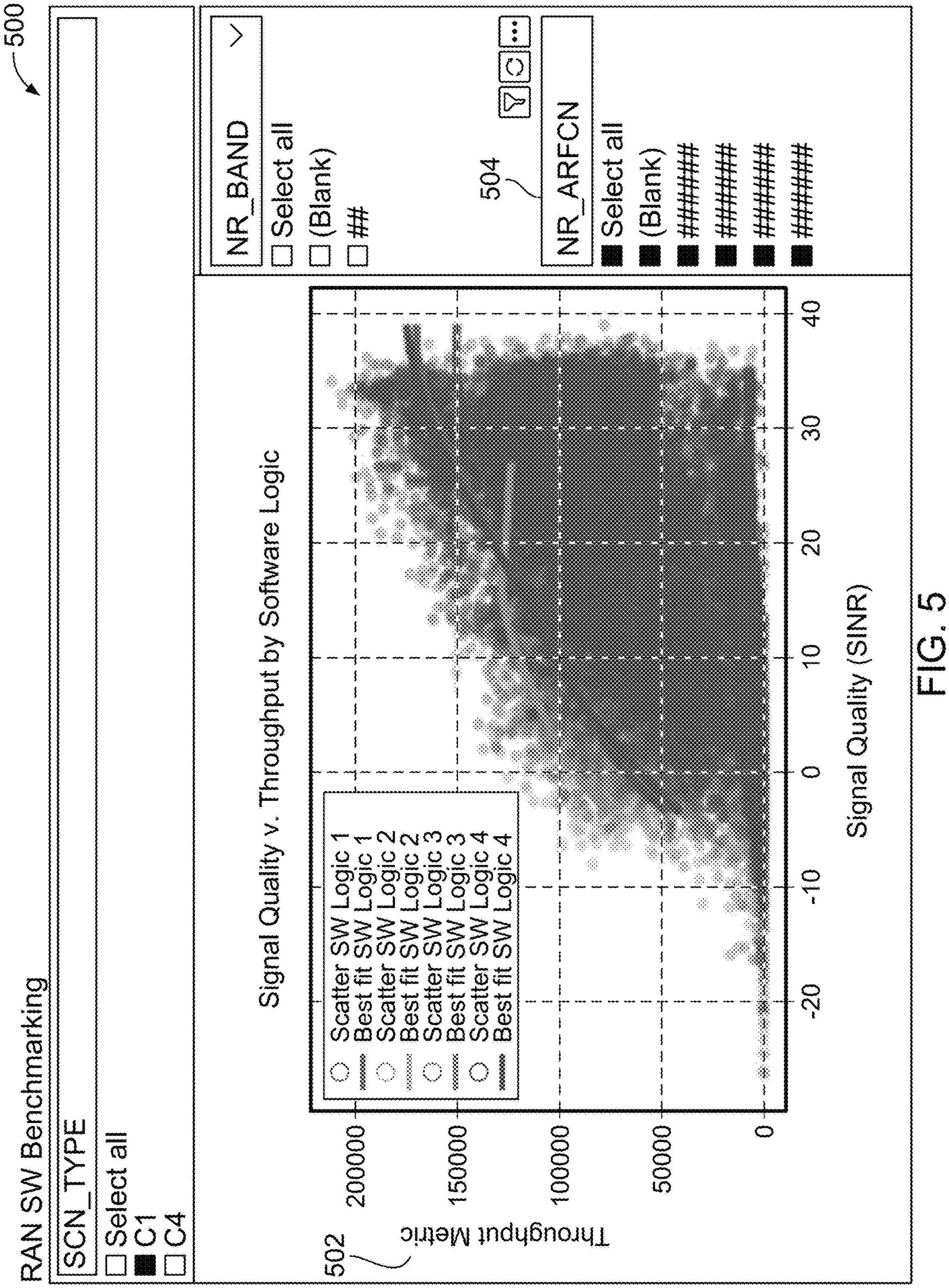

FIG. 5 shows another user interface 500 that can be helpful for software benchmarking. The user interface 500 displays information about the signal quality (e.g., signal to interference and noise ratio [SINR]) and throughput of user device connections to wireless equipment of the cellular network using different software logics. Visualization 502 of the user interface 500 shows, for four different software logics, a scatterplot of SINR and a throughput metric. For ease of comparison between logics, the visualization 502 further includes "best fit" curves for each of the software logics. These link curves represent a summary statistic calculated by aggregating the throughput values for individual points in the scatterplot. For example, the throughput values for the link curves can be calculated by fitting a curve to the throughput values for individual points in the scatterplot. The user interface 500 further includes a menu 504 that includes multiple user-selectable options corresponding to different software logics. The visualizations of the user interface 500 can be dynamically updated to reflect the selected user-selectable options. By analyzing these visualizations, a user can compare the performance of software logics to determine which software logic, if any, to implement across the cellular network. A user may also identify performance issues associated with a particular software logic to generate recommendations for features that should be fixed or improved. In some implementations, certain analyses can be performed automatically by a computing device (e.g., the user's device, a computing device owned by the cellular network provider, a remote cloud-based server, etc.). For example, a software logic can be automatically selected (or rejected) for broader implementation on a cellular network based on pre-defined thresholds of performance metrics (e.g., SINR, throughput metrics, etc.). In some implementations, the computing device can also generate recommendations or action items for a user that can be presented on the user interface. For example, the computing device can generate recommendations for improving or fixing particular features of a software logic to improve its performance characteristics. These generated recommendations can be presented on the user interface 500.

Figure 6:
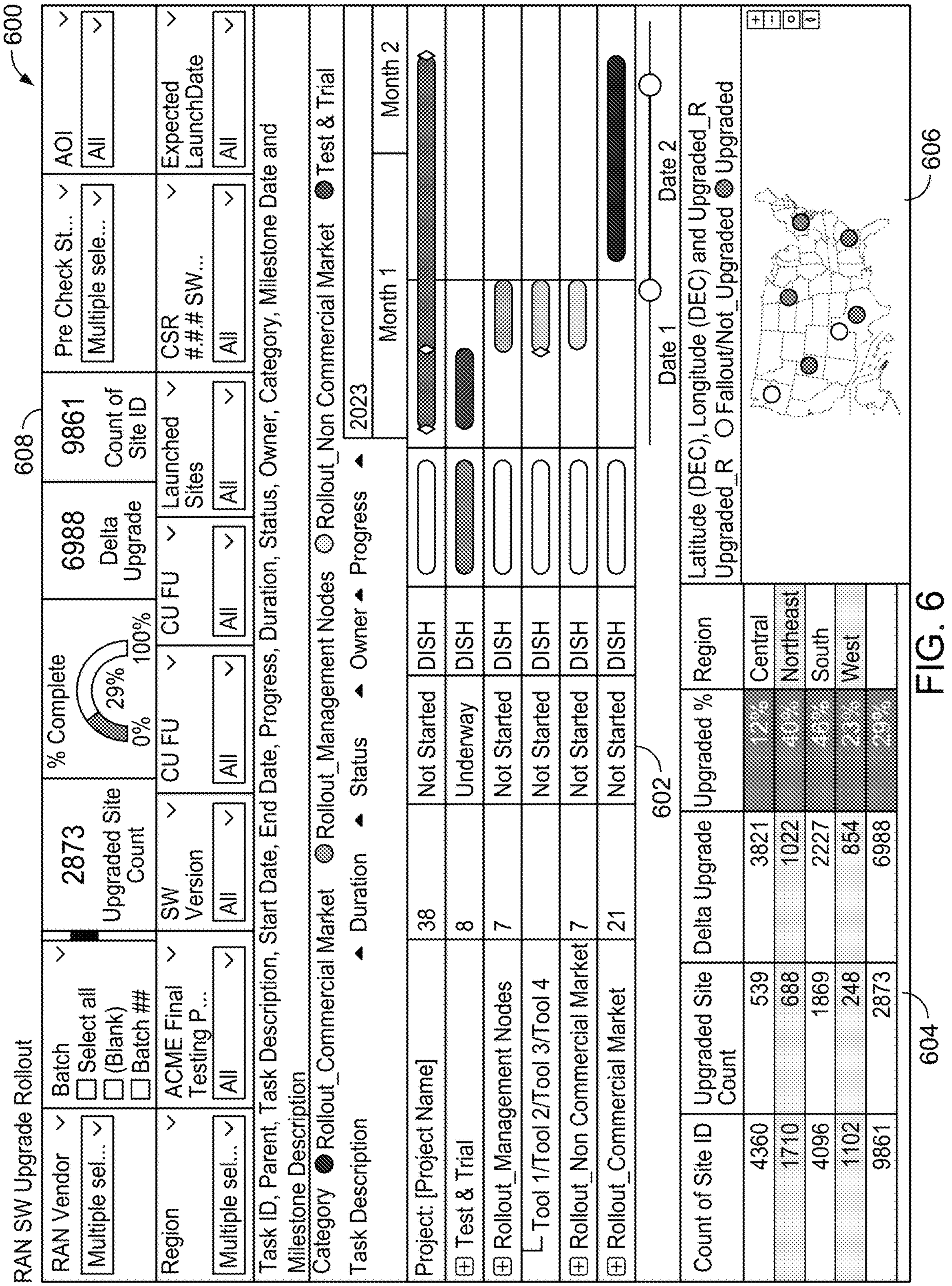

FIG. 6 shows a user interface 600 that can be particularly helpful for monitoring the rollout of a software upgrade on a cellular network. For example, data about wireless site locations, the software logics running on each site, the performance characteristics (or "health") of these wireless sites, and the planning and execution of a software rollout operation can all be stored in a centralized repository such as the data lake 104 and correlated with one another (and other collected data) to monitor the rollout of a software upgrade. The user interface 600 includes a Gantt chart visualization 602 that shows data about the planned timeline for the software rollout, including progress indicators for various portions of the software rollout. The user interface 600 also includes a table 604 that shows, for different regions of a cellular network (e.g., Central, Northeast, South, West), a total number of wireless sites, a number of upgraded wireless sites, a number of wireless sites that have yet to be upgraded, and a completion percentage. The user interface 600 further includes a map 606 that shows the locations of various wireless sites, including an indication of whether or not they have been upgraded. The user interface 600 further includes a menu 608 including user-selectable options for selecting certain vendors, regions, wireless sites, software versions of interest, etc. The visualizations of the user interface 600 can be dynamically updated to reflect the selected user-selectable options. The menu 608 also includes a dashboard showing an overall wireless site count, a number of upgraded wireless sites, a number of wireless sites that have yet to be upgraded, and a completion percentage. By analyzing these visualizations, a user can monitor the progress of a software rollout process. In some implementations, certain analyses can be performed automatically by a computing device (e.g., the user's device, a computing device owned by the cellular network provider, a remote cloud-based server, etc.). For example, if progress falls behind the planned timeline for the software rollout, an alert can be automatically sent to a user and/or displayed on the user interface 600. In some implementations, the computing device can also generate recommendations or action items for a user that can be presented on the user interface. For example, the computing device can generate recommendations for looking into reasons why the software rollout in a particular region is behind schedule relative to other regions. These generated recommendations can be presented on the user interface 600.

FIG. 7 shows a user interface 700 that can be particularly helpful for coordination of multiple projects occurring across the cellular network. Sometimes these projects can be associated with different verticals or departments within a cellular network provider organization. For example, in addition to the rollout of a software upgrade, other projects occurring across the cellular network can include implementation of "Open Platform Communications" (OPC) or other standards (e.g., interoperability standards) across the cellular network. In some implementations, a cellular network provider may only desire to implement projects during particular hours (e.g., when most users are asleep). Accordingly, it can be helpful to coordinate the implementation of projects to avoid conflicting implementation dates. To facilitate this coordination, data about implementation dates and progress for various projects can be stored in a centralized repository such as the data lake 104 and correlated with one another (and other collected data). The user interface 700 includes a table 702 that shows, for different regions and markets of a cellular network, various project implementation periods and start dates as well as an indicator of upgrade completion. The user interface 700 further includes a menu 704 including user-selectable options for selecting certain vendors, regions, wireless sites, software versions of interest, etc. The visualizations of the user interface 700 can be dynamically updated to reflect the selected user-selectable options. The menu 704 also includes a dashboard showing an overall wireless site count, a number of upgraded wireless sites, a number of wireless sites that have yet to be upgraded, and a completion percentage. By analyzing these visualizations, a user can monitor the progress of projects while avoiding conflicts with other projects being implemented across the cellular network. In some implementations, certain analyses can be performed automatically by a computing device (e.g., the user's device, a computing device owned by the cellular network provider, a remote cloud-based server, etc.). For example, if a project conflict is detected, an alert can be automatically sent to a user and/or displayed on the user interface 700 to notify the user of the conflict. In some implementations, the computing device can also generate recommendations or action items for a user that can be presented on the user interface. For example, the computing device can generate recommendations for alternative dates for implementing a project (e.g., a software upgrade) on particular wireless sites of the cellular network. These generated recommendations can be presented on the user interface 700.

FIG. 8 shows a user interface 800 that can be particularly helpful for integration of a wireless site into a cellular network. For example, when a wireless site is integrated into a cellular network, certain milestones are achieved as part of the "build plan" including installing a wireless tower, supplying power to the wireless site, establishing telecommunication connections, performing site testing, etc. Data about the progress of wireless site integration at various regions and markets of the cellular network can be stored in a centralized repository such as the data lake 104 and correlated with one another (and other collected data) to facilitate the wireless site integration process. The user interface 800 includes tables 802, 806 that show examples of such milestone data and build plan progress. The user interface 800 also includes a map 804 that shows the relative number of wireless sites in progress, and which regions they are located in. The user interface 800 further includes a menu 808 including user-selectable options for selecting wireless sites of particular priorities, phases, and build plan years. The visualizations of the user interface 800 can be dynamically updated to reflect the selected user-selectable options. The menu 808 also includes a dashboard that presents summary information about the number of sites that have reached particular milestones (e.g., site acceptance, on-air, telecommunications established, power supplied, etc.) By analyzing these visualizations, a user can monitor the progress of wireless site integration into the cellular network. A user may also determine when a wireless site is ready to progress into the next stage of development so that relevant vendors or project managers can be contacted accordingly. In some implementations, certain analyses can be performed automatically by a computing device (e.g., the user's device, a computing device owned by the cellular network provider, a remote cloud-based server, etc.). For example, if a wireless site progresses to a certain stage of development, an alert can be automatically sent to a user and/or displayed on the user interface 800. In some implementations, the computing device can also generate recommendations or action items for a user that can be presented on the user interface. For example, the computing device can generate recommendations for contacting a vendor or a project manager responsible for the next stage of development for a wireless site. These generated recommendations can be presented on the user interface 800. In some implementations, the computing device can email the vendor or project manager automatically.

Figure 9:
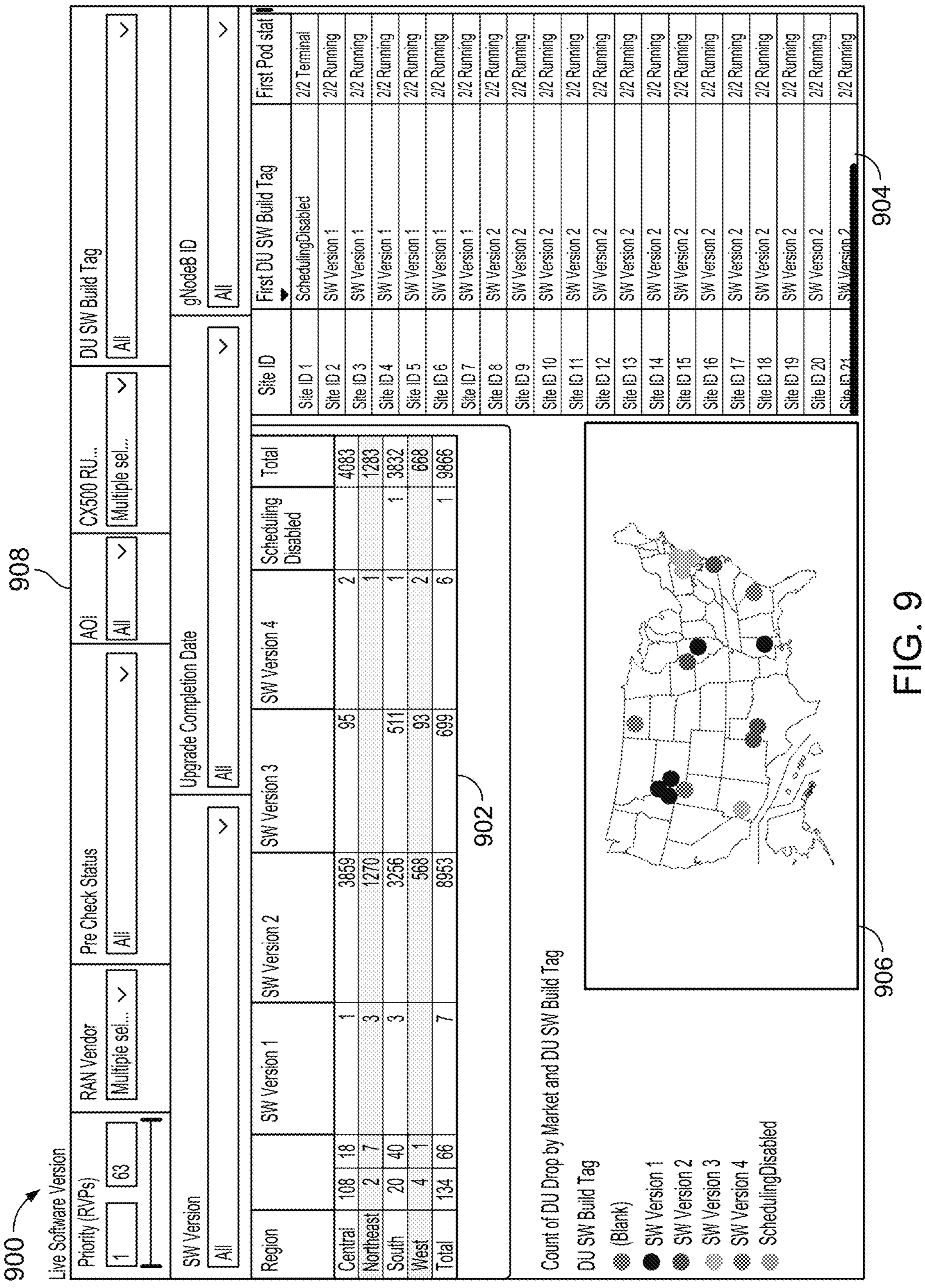

FIG. 9 shows a user interface 900 that can be particularly helpful for investigating the software versions currently being implemented on a cellular network. For example, data about the software versions being implemented on various wireless sites, the locations of those wireless sites, etc. can be stored in a centralized repository such as the data lake 104 and correlated with one another (and other collected data) to monitor the current or "live" software versions being implemented at wireless sites across the cellular network. The user interface 900 includes a table 902 that shows, for different regions, the number of wireless sites implementing various software versions. The user interface 900 also includes a table 904 that shows, for each wireless site, a software version being implemented. The user interface 900 further includes a map 906 that shows a geographic representation of the software versions being implemented across the cellular network. The user interface 900 further includes a menu 908 including user-selectable options for selecting certain wireless site priorities, vendors, statuses, software versions, etc. The visualizations of the user interface 900 can be dynamically updated to reflect the selected user-selectable options. By analyzing these visualizations, a user can quickly monitor what software is being implemented on various wireless sites of the cellular network. For example, it may be desirable that most of the wireless sites in a cellular network are operating using the same software version, with only limited exceptions made, for example, for performance testing of new software versions. By using the user interface 900, a user can quickly identify if multiple software versions are being implemented across the cellular network and investigate the reasons why that may be the case. In some implementations, certain analyses can be performed automatically by a computing device (e.g., the user's device, a computing device owned by the cellular network provider, a remote cloud-based server, etc.). For example, if the predominant software version implemented across the cellular network drops below a pre-defined threshold (e.g. 99%, 99.5%, 99.9% of wireless sites), then an alert can be automatically presented on the user interface 900. In some implementations, the computing device can also generate recommendations or action items for a user that can be presented on the user interface. For example, the computing device can generate recommendations for updating the software implemented at wireless sites that are not in conformity with the predominant software version implemented across the majority of the cellular network. These generated recommendations can be presented on the user interface 900.

Figure 10:
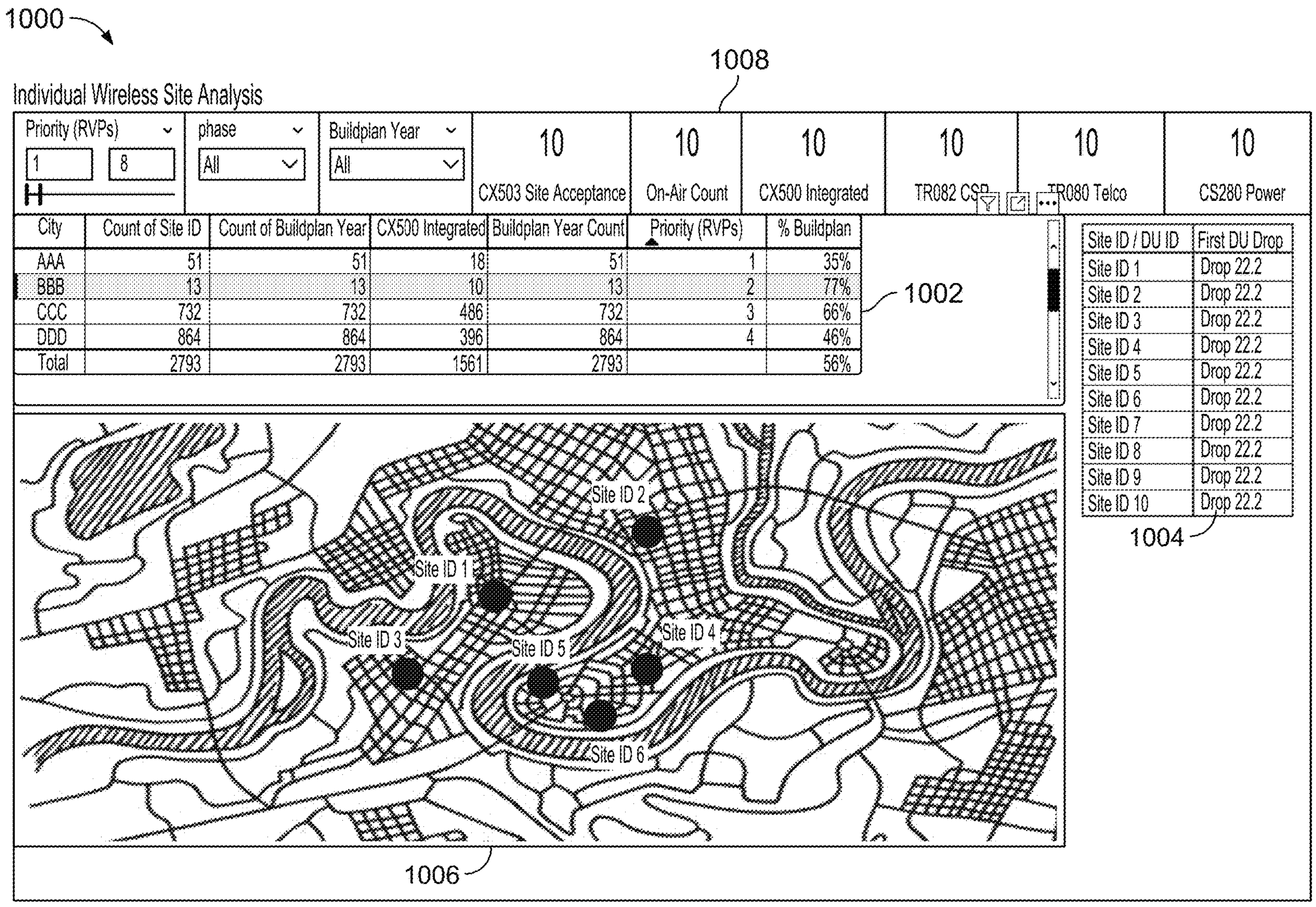

FIG. 10 shows a user interface 1000 that can be particularly helpful for investigating the details of individual wireless sites within a cellular network. For example, the locations of wireless sites, development details of the wireless sites, software versions implemented at the wireless sites, etc. can be stored in a centralized repository such as the data lake 104 and correlated with one another (and other collected data) to allow a user to investigate the details of individual wireless sites. The user interface 1000 includes a table 1002 that shows, for different cities, the number of wireless sites and summary statistics of those wireless sites. The user interface 1000 also includes a table 1004 that shows, for a selected city of interest, the individual wireless sites located in that city. The user interface 1000 further includes a map 1006 that shows the geographic location of the individual wireless sites in the context of the surrounding area. Thus, a user can use the map to identify, for example, if there are nearby roads or railways or if there may be any nearby structures that could interfere with signal quality. A user can also select individual wireless sites on the map 1006 to view additional details about the wireless site including wireless equipment inventory, development details, software implemented, etc. The user interface 1000 further includes a menu 1008 including user-selectable options for filtering out certain wireless sites. The visualizations of the user interface 1000 can be dynamically updated to reflect the selected user-selectable options.

Figure 11:
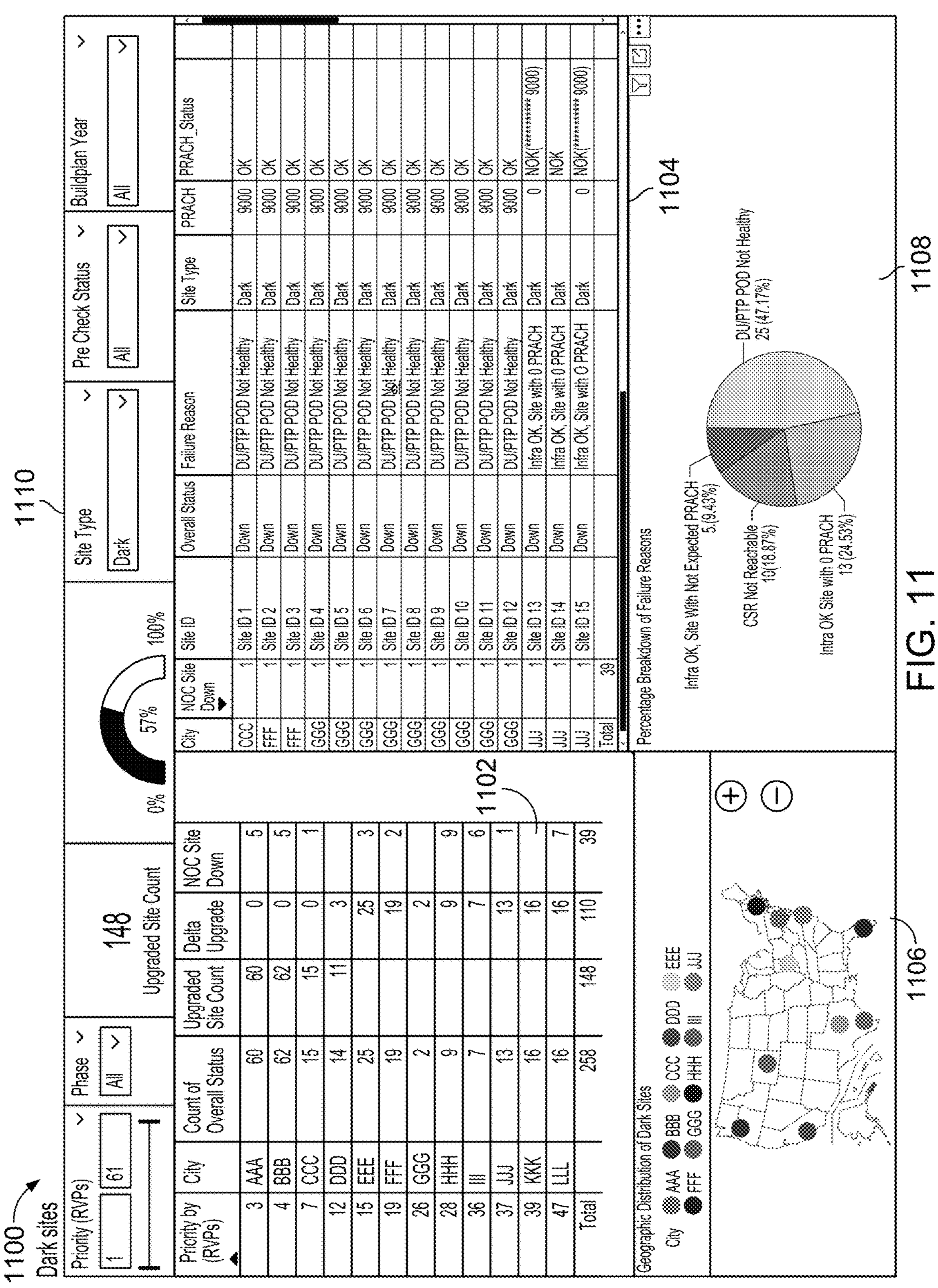

FIG. 11 shows a user interface 1100 that can be particularly helpful for analyzing characteristics of a particular set of wireless sites referred to as "dark sites." In some implementations of a cellular network, a fiber connection might not be established with each and every wireless site of a cellular network. For example, in highly populated areas with a substantial amount of infrastructure, it may not be feasible or cost-effective to establish a fiber connection to each and every wireless site of the cellular network. Instead, a fiber connection can be established with a data center, and wireless sites without a fiber connection can be connected (e.g., directly or indirectly) to the data center via the cloud. The wireless sites that do not have a fiber connection can be referred to as "dark sites." Data about various characteristics of dark sites in a cellular network (e.g., wireless site locations, wireless site development details, wireless site performance characteristics or "health" status, etc.) can be stored in a centralized repository such as the data lake 104 and correlated with one another (and other collected data) to enable a user to analyze characteristics of the dark sites. The user interface 1100 includes a table 1102 that shows, for different cities, information about the dark sites in those cities including a number of dark sites, a number of upgraded dark sites, and a number of dark sites that are "down" or out of operation. The user interface 1100 also includes a table 1104 that shows, for individual dark sites, characteristics of the dark sites including whether or not they are down and the reason for their failure (if any). The user interface 1100 further includes a map 1106 that shows the geographic distribution of dark sites, which can be zoomed into for analysis of individual dark sites. The user interface 1100 further includes a pie chart 1108 that shows the breakdown of reasons for dark site failure. The user interface 1100 further includes a menu 1110 including user-selectable options for filtering out certain wireless sites. The visualizations of the user interface 1100 can be dynamically updated to reflect the selected user-selectable options. The menu 1110 also includes a dashboard that shows summary statistics about an upgrade status of the dark sites in the cellular network. By analyzing these visualizations, a user can analyze various characteristics of the dark sites of the network, for example, to identify if the dark sites in a particular city have been upgraded or are performing healthily. A user may also identify a common failure reason such as a data center that is unable to be connected to by dark sites, which may be indicative of an issue that should be resolved. In some implementations, certain analyses can be performed automatically by a computing device (e.g., the user's device, a computing device owned by the cellular network provider, a remote cloud-based server, etc.). For example, if a certain proportion of dark sites in a particular city are down, an alert can be automatically generated and presented on the user interface 1100. In some implementations, the computing device can also generate recommendations or action items for a user that can be presented on the user interface 1100. For example, the computing device can generate recommendations for resolving issues corresponding to common failure reasons of the dark sites of the cellular network (e.g., an unreachable data center). These generated recommendations can be presented on the user interface 1100.

Figure 12:
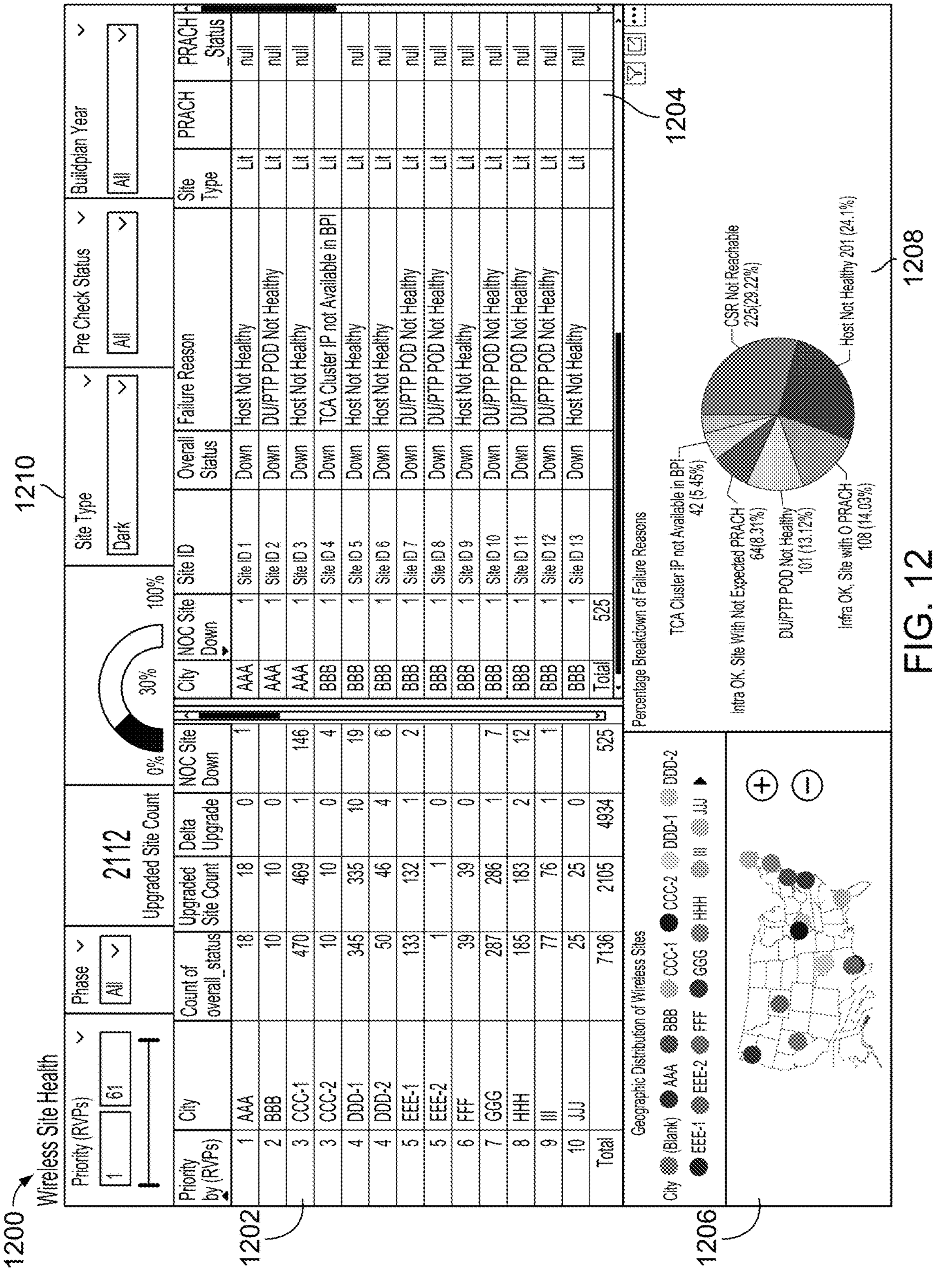

FIG. 12 shows a user interface 1200 that is similar to the user interface 1100 shown in FIG. 11, but includes all wireless site types (as opposed to only dark sites). Data about various characteristics of the wireless sites in a cellular network (e.g., wireless site locations, wireless site development details, wireless site performance characteristics or "health" status, etc.) can be stored in a centralized repository such as the data lake 104 and correlated with one another (and other collected data) to enable a user to analyze characteristics of the wireless sites. The user interface 1200 includes a table 1202 that shows, for different cities, information about the wireless sites in those cities including a number of wireless sites, a number of upgraded wireless sites, and a number of wireless sites that are "down" or out of operation. The user interface 1200 also includes a table 1204 that shows, for individual wireless sites, characteristics of the wireless sites including whether or not they are down and the reason for their failure (if any). The user interface 1200 further includes a map 1206 that shows the geographic distribution of wireless sites, which can be zoomed into for analysis of individual wireless sites. The user interface 1200 further includes a pie chart 1208 that shows the breakdown of reasons for wireless site failure. The user interface 1200 further includes a menu 1210 including user-selectable options for filtering out certain wireless sites. The visualizations of the user interface 1200 can be dynamically updated to reflect the selected user-selectable options. The menu 1210 also includes a dashboard that shows summary statistics about an upgrade status of the wireless sites in the cellular network. By analyzing these visualizations, a user can analyze various characteristics of the wireless sites of the network, for example, to identify if the wireless sites in a particular city have been upgraded or are performing healthily. A user may also identify a common failure reason for the wireless sites, which may be indicative of an issue that should be resolved. In some implementations, the user interface 1200 can also be used to trace the particular reason why a call was dropped (e.g., to respond to a customer complaint). For example, by identifying the particular wireless site that a customer device was connected to when the call was dropped, a user of the user interface 1200 could investigate whether or not that particular wireless site was down and the reason for its failure. In some implementations, certain analyses can be performed automatically by a computing device (e.g., the user's device, a computing device owned by the cellular network provider, a remote cloud-based server, etc.). For example, if a certain proportion of wireless sites in a particular city are down, an alert can be automatically generated and presented on the user interface 1200. In some implementations, the computing device can also generate recommendations or action items for a user that can be presented on the user interface 1200. For example, the computing device can generate recommendations for resolving issues corresponding to common failure reasons of the wireless sites of the cellular network (e.g., an unhealthy host). These generated recommendations can be presented on the user interface 1200.

Figure 13:
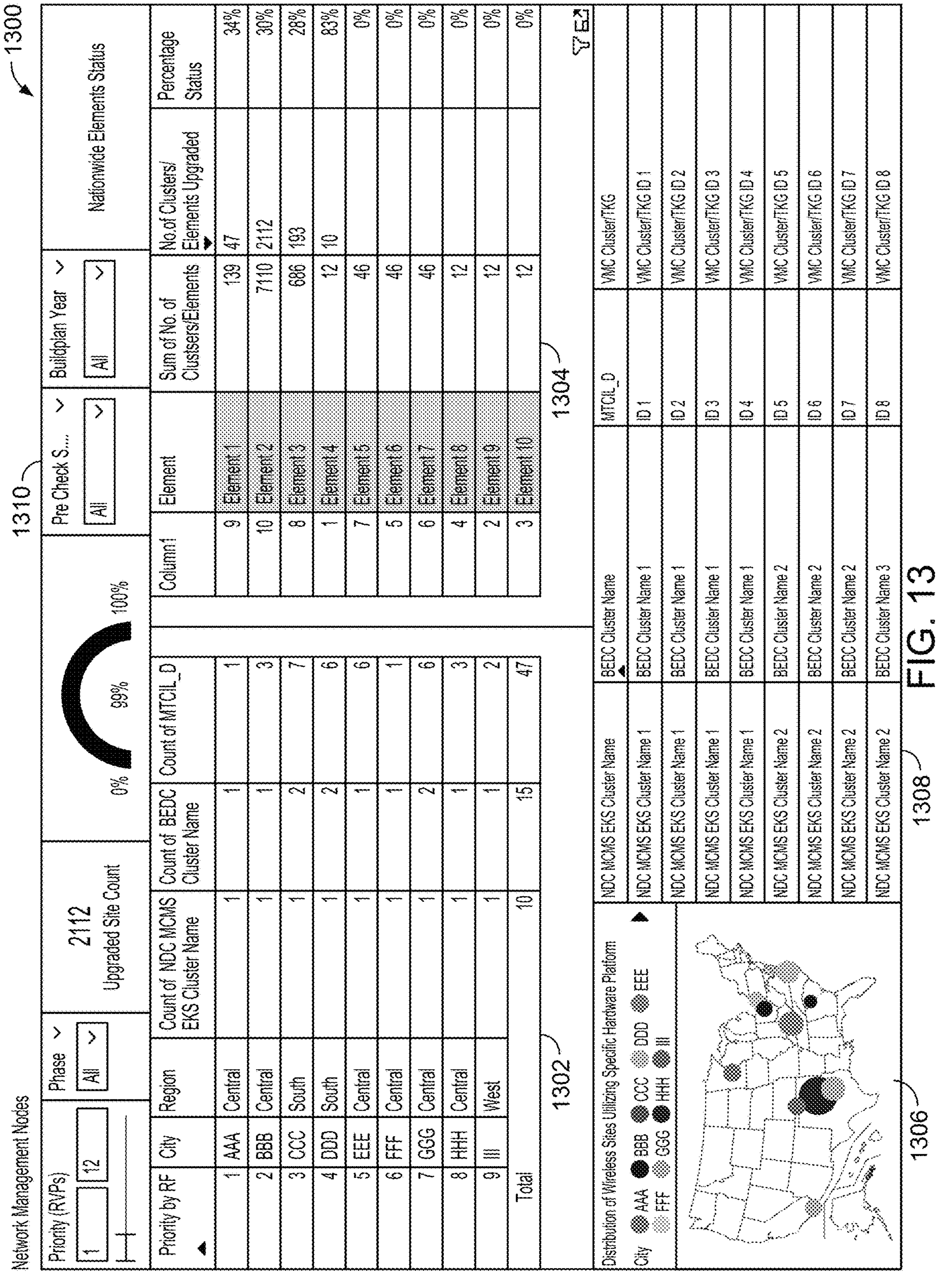

FIG. 13 shows a user interface 1300 that can be particularly helpful for investigating the hardware platforms or "nodes" on which software deployed on the cellular network runs. For example, wireless sites of the cellular network in particular cities can run software on computer clusters of external cloud platforms (e.g., Amazon Web Services (AWS), VMware Cloud, etc.). As such, it can be desirable, in some implementations, to identify the particular computer clusters being utilized by a wireless site. To provide this functionality, data about wireless sites (e.g., wireless site locations, wireless site identifiers, etc.) and hardware platforms (e.g., computer cluster identifiers, computer cluster technical specifications, computer cluster providers, computer cluster locations, etc.) can be stored in a centralized repository such as the data lake 104 and correlated with one another (and other collected data). The user interface 1300 includes a table 1302 that shows, for various cities, the number of computer clusters being utilized by wireless sites in those cities. The user interface 1300 also includes a table 1304 that shows, for different cluster types or "elements," a total number of clusters/elements and a number of upgraded clusters/elements. The user interface 1300 further includes a map 1306 that shows a geographic distribution of wireless sites utilizing hardware platforms of a particular type. The user interface 1300 further includes a table 1308 that shows the hardware platforms utilized by individual wireless sites. The user interface 1300 further includes a menu 1310 including user-selectable options for filtering out certain wireless sites. The visualizations of the user interface 1300 can be dynamically updated to reflect the selected user-selectable options. The menu 1310 also includes a dashboard showing summary data about the progress of a hardware platform upgrade process. By analyzing these visualizations, a user can identify the computer clusters that are being utilized by wireless sites throughout the cellular network, for example, to manage cloud computing costs, meet technical requirements for the cellular network, and/or perform a hardware platform upgrade. In some implementations, certain analyses can be performed automatically by a computing device (e.g., the user's device, a computing device owned by the cellular network provider, a remote cloud-based server, etc.). For example, if the wireless sites in a particular city are connected several different computer clusters, an alert can be automatically sent to a user and/or displayed on the user interface 1300 so that the user can consider using a single cluster for the wireless sites. In some implementations, the computing device can also generate recommendations or action items for a user that can be presented on the user interface. For example, the computing device can generate recommendations for a particular hardware platform that should be utilized by a wireless site (e.g., to reduce costs, meet technical requirements, etc.). These generated recommendations can be presented on the user interface 1300.

FIG. 14 shows a user interface 1400 that can be particularly helpful for monitoring traffic shaping on a cellular network. Traffic shaping refers to a bandwidth management technique used on networks by defining particular routes for network traffic (e.g., in individual cities) to improve network performance characteristics such as latency and usable bandwidth. To enable the monitoring of traffic shaping on a cellular network, data about wireless sites (e.g., wireless site locations, health status, etc.) and the progress of traffic shaping upgrades can be stored in a centralized repository such as the data lake 104 and correlated with one another (and other collected data). The user interface 1400 includes a table 1402 that shows, for different cities, a number of wireless sites, a number of upgraded wireless sites, a number of wireless sites that are down, a progress indicator for a traffic shaping upgrade, etc. The user interface 1400 also includes a map 1404 that shows a geographic distribution of the wireless sites of interest. The user interface 1400 further includes a pie chart 1406 that shows, the regional breakdown of upgraded wireless sites. The user interface 1400 further includes a menu 1408 including user-selectable options for filtering out certain wireless sites. The visualizations of the user interface 1400 can be dynamically updated to reflect the selected user-selectable options. By analyzing these visualizations, a user can monitor the progress of a traffic shaping upgrade across the cellular network, for example, to determine when a next milestone or upgrade for the wireless sites can be completed. In some implementations, certain analyses can be performed automatically by a computing device (e.g., the user's device, a computing device owned by the cellular network provider, a remote cloud-based server, etc.). For example, if the progress indicator for the traffic shaping upgrade in a particular city exceeds a threshold amount (e.g., 80%, 85%, 90%, 95%, 99%, etc.), an alert can be automatically sent to a user and/or displayed on the user interface 1400. In some implementations, the computing device can also generate recommendations or action items for a user that can be presented on the user interface. For example, the computing device can generate recommendations for initiating another phase of a wireless site development process in response to determining that a traffic shaping upgrade process is complete (or nearly complete). These generated recommendations can be presented on the user interface 1400.

Figure 15:
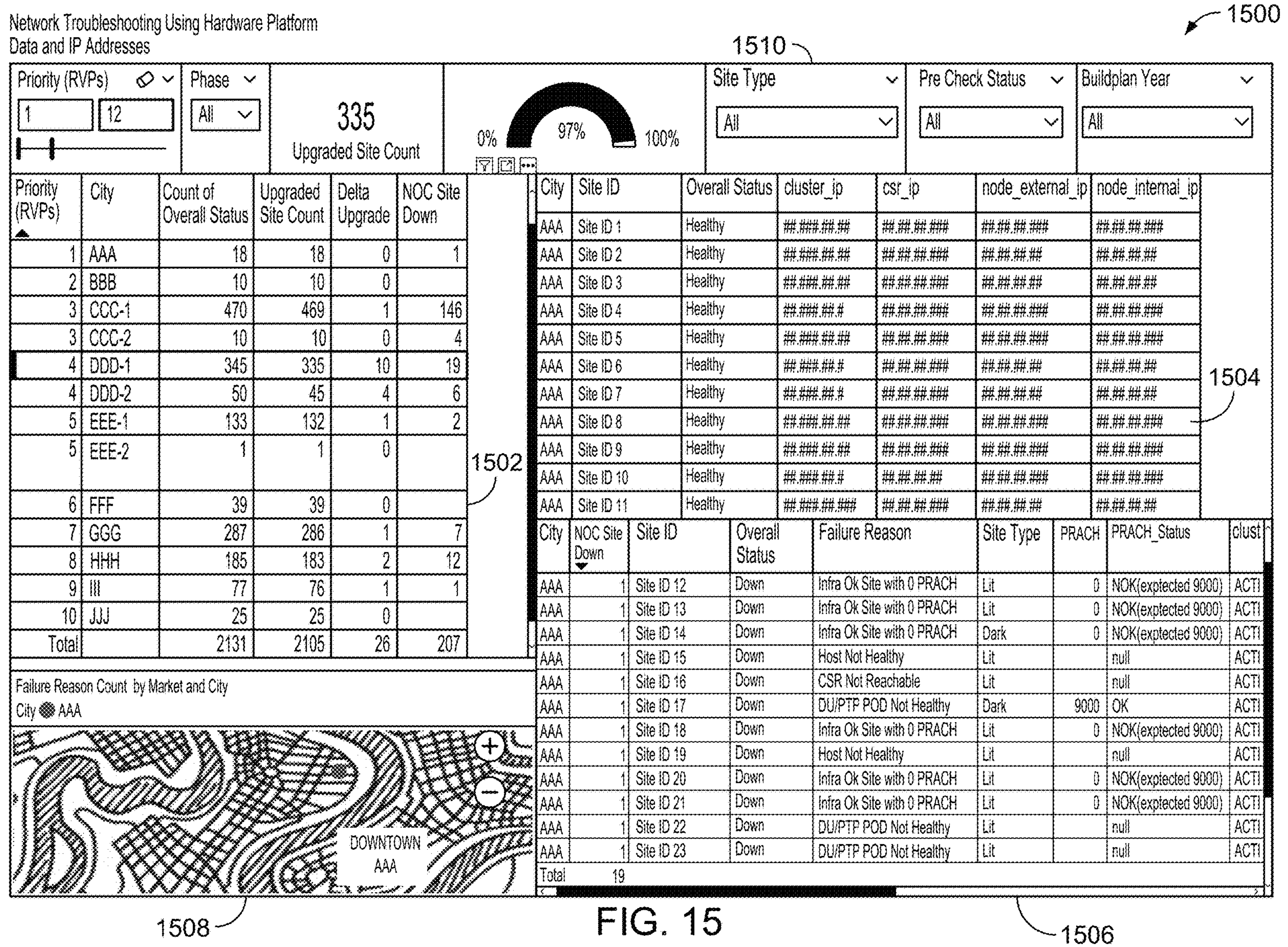

FIG. 15 shows a user interface 1500 that can be particularly helpful for troubleshooting issues on a cellular network using hardware platform data and IP address information. For example, data about the hardware platforms utilized by wireless sites, the health status of the wireless sites, and the IP addresses of the hardware platforms and cellular network nodes can all be stored in a centralized repository such as the data lake 104 and correlated with one another (and other collected data) for troubleshooting purposes. The user interface 1500 includes a table 1502 that shows, for different cities, a total number of wireless sites, a number of upgraded wireless sites, a number of wireless sites that are down, etc. The user interface 1500 also includes a table 1504 that shows, for healthy wireless sites in a particular city, corresponding IP addresses on the node. The user interface 1500 further includes a table 1506 that shows, for wireless that are down in a particular city, the reasons for the failure. The user interface 1500 further includes a map 1508 that shows geographic features of the particular city of interest. The user interface 1500 further includes a menu 1510 including user-selectable options for filtering out certain wireless sites. The visualizations of the user interface 1500 can be dynamically updated to reflect the selected user-selectable options. By analyzing these visualizations, a user can more efficiently troubleshoot issues with the cellular network, for example, by identifying the IP addresses of clusters and nodes that correspond to wireless sites that are down.

Figure 16:
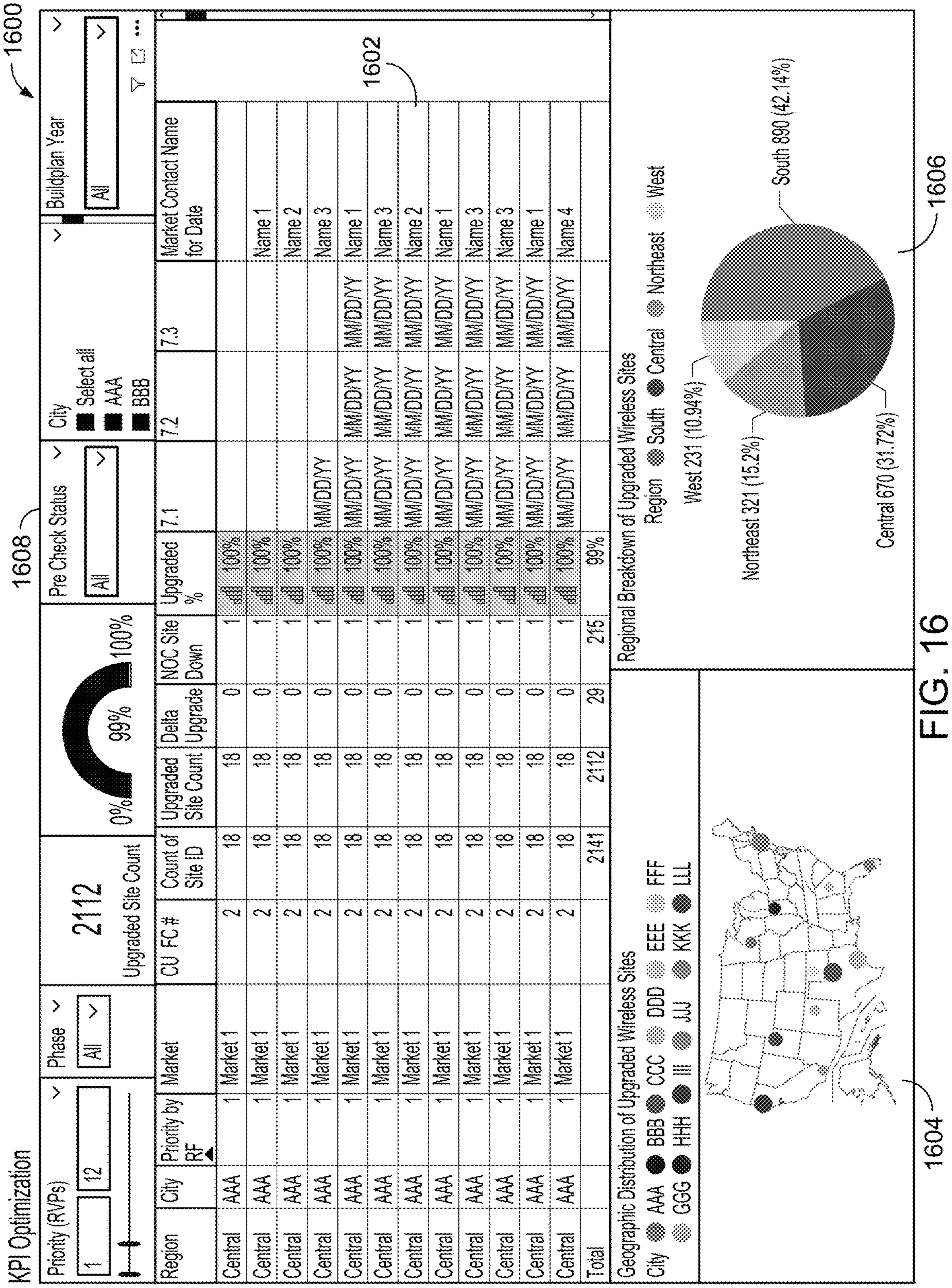

FIG. 16 shows a user interface 1600 that can be particularly helpful for optimization of key performance indicators (KPIs) such as metrics of signal strength, signal quality, throughput, accessibility of the network, dropped calls, etc. For example, when initially launching a cellular network, it can be important to ensure that the wireless sites of the cellular network have been optimized (e.g., by modifying engineering-related parameters, frequency bands, etc.) such that a set of KPIs all exceed pre-defined threshold levels. Each wireless site can be considered optimized or "upgraded" upon determining that a metric of signal strength exceeds a pre-defined threshold level, a metric of signal quality exceeds a pre-defined threshold level, a metric of throughput exceeds a pre-defined threshold level, a metric of network accessibility exceeds a pre-defined threshold level, a metric of call retention exceeds a threshold level, etc. To monitor this optimization process across the cellular network, data about KPIs for different wireless sites, locations of the wireless sites, etc. can all be stored in a centralized repository such as the data lake 104 and correlated with one another (and other collected data). The user interface 1600 includes a table 1602 that shows, for different markets (e.g., cities), a total number of wireless sites in each market, a number of upgraded wireless sites, a percentage of upgraded wireless sites, dates that KPI optimization was achieved, etc. The user interface 1600 also includes a map 1604 that shows a geographic distribution of upgraded wireless sites and a pie chart 1606 that shows a regional breakdown of upgraded wireless sites. The user interface 1600 further includes a menu 1608 including user-selectable options for filtering out certain wireless sites. The visualizations of the user interface 1600 can be dynamically updated to reflect the selected user-selectable options. The menu 1608 also includes a dashboard that shows summary data about the progress of the KPI optimization process (e.g., total upgraded wireless site count, percent completion, etc.). By analyzing these visualizations, a user can monitor the progress of the KPI optimization process, for example, to determine when the cellular network is ready to launch or to contact individuals responsible for wireless sites that have not been successfully upgraded. In some implementations, certain analyses can be performed automatically by a computing device (e.g., the user's device, a computing device owned by the cellular network provider, a remote cloud-based server, etc.). For example, the determination that the pre-defined thresholds for KPIs have been achieved for a particular wireless site can be determined automatically. In some implementations, the computing device can also generate recommendations or action items for a user that can be presented on the user interface. For example, once a threshold percentage (e.g., 90%, 95%, 99%, etc.) of the wireless sites have all been upgraded, the computing device can generate a recommendation for a user to initiate a subsequent process of a cellular network launch process. In another example, the computing device can generate a recommendation to contact, or may automatically contact, an individual responsible for a market of interest where wireless sites have not been successfully upgraded. These generated recommendations can be presented on the user interface 1600.

Figure 17:
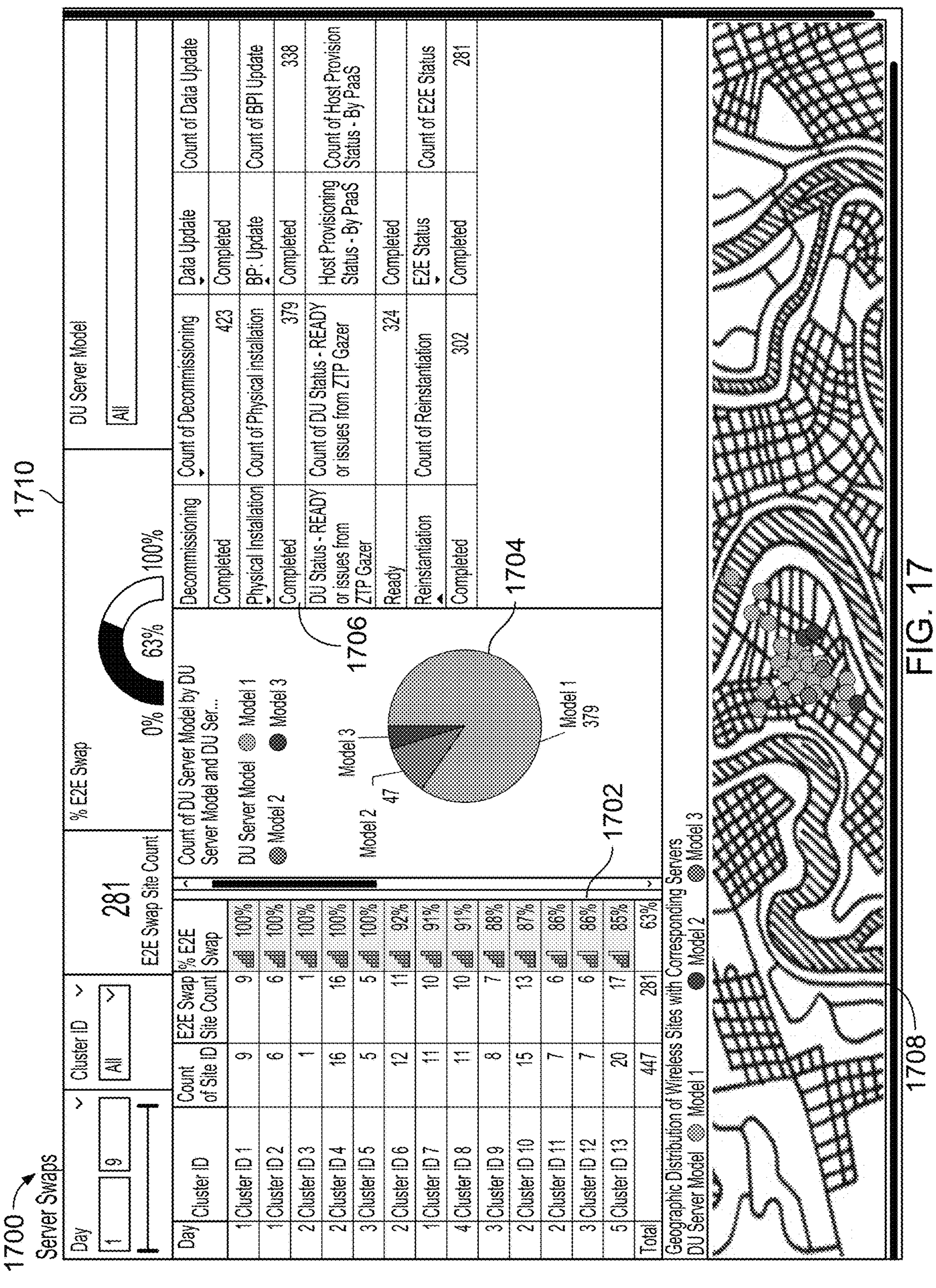

FIG. 17 shows a user interface 1700 that can be particularly helpful for facilitating a server swapping process. For example, existing servers in a particular city may be replaced or swapped with updated hardware. To monitor this server swapping process, data about wireless sites and corresponding computer clusters in the city (e.g., the wireless site locations, the server models utilized, a server installation status, etc.) can all be stored in a centralized repository such as the data lake 104 and correlated with one another (and other collected data). The user interface 1700 includes a table 1702 that shows, for different clusters, a total number of wireless sites, a number of wireless sites where a server swap was completed, a server swap completion percentage, etc. The user interface 1700 also includes a pie chart 1704 that shows a breakdown of the server models used among the wireless sites of interest. The user interface 1700 further includes visualization 1706 which provides more granular details about the server swapping process including a number of wireless sites where old servers were decommissioned, a number of wireless sites where new servers were physically installed, etc. The user interface 1700 further includes a map 1708 that shows a geographic distribution of the wireless sites, with an indication of the server models currently implemented at each wireless site. The user interface 1700 further includes a menu 1710 including user-selectable options for filtering out certain wireless sites. The visualizations of the user interface 1700 can be dynamically updated to reflect the selected user-selectable options. The menu 1710 also includes a dashboard that shows summary data about the progress of the server swapping process (e.g., total servers swapped, percent completion, etc.). By analyzing these visualizations, a user can monitor the progress of the server swapping process, for example, to determine when the process is complete. In some implementations, certain analyses can be performed automatically by a computing device (e.g., the user's device, a computing device owned by the cellular network provider, a remote cloud-based server, etc.). For example, if the percent completion of server swaps exceeds a threshold amount (e.g., 80%, 85%, 90%, 95%, 99%, etc.), an alert can be automatically sent to a user and/or displayed on the user interface 1700 to notify the user that the server swapping process is complete (or nearly complete). In some implementations, the computing device can also generate recommendations or action items for a user that can be presented on the user interface. For example, in response to determining that the server swapping is complete (or nearly complete), the computing device can generate a recommendation for a user to initiate a subsequent process for the wireless sites of interest such as determining which software to deploy at the new servers. These generated recommendations can be presented on the user interface 1700.

Figure 18:
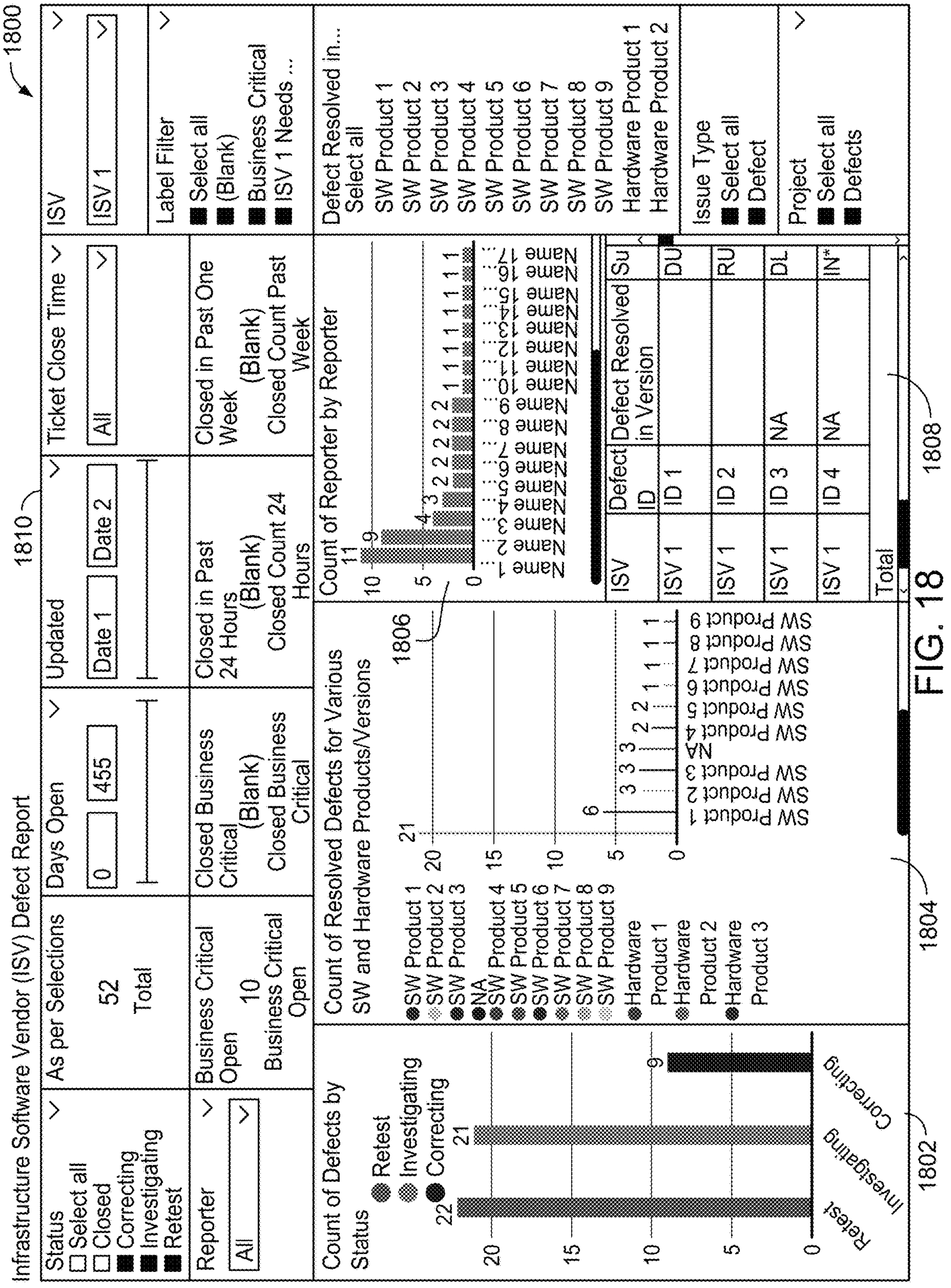

FIG. 18 shows a user interface 1800 that can be particularly helpful for tracking defects in software or hardware provided by external vendors (e.g., infrastructure software vendors [ISVs]). Every time a defect is identified in software or hardware provided by an external vendor, data can be stored about the defect including the vendor information, the status of the defect (e.g., retesting, investigating, correcting, etc.), the software or hardware product delivered, an individual who reported the defect, a number of days it took for the defect to be resolved, etc. This data can all be stored in a centralized repository such as the data lake 104 and correlated with one another (and other collected data) to produce defect reports such as the one shown in user interface 1700. The user interface 1800 includes a bar plot 1802 that shows the status of various unresolved defects, a bar plot 1804 that shows counts of resolved defects for different software and hardware products/versions provided by external vendors, and a bar plot 1806 that shows counts of defects reported by particular individuals. The user interface 1800 further includes a table 1808 that includes information about the vendor, a defect identifier, a status of the defect (e.g., resolved, retesting, investigating, correcting), etc. The user interface 1800 further includes a menu 1810 including user-selectable options for filtering out certain defects, for example, based on status, vendor, issue type, software version or hardware product, etc. The visualizations of the user interface 1800 can be dynamically updated to reflect the selected user-selectable options. The menu 1810 also includes a dashboard that shows summary data about the defects such as a total number of current defects and a number of "business critical" current defects. By analyzing these visualizations, a user can monitor the existence of defects in vendor-provided software or hardware as well as the progress made in addressing these defects. In some implementations, certain analyses can be performed automatically by a computing device (e.g., the user's device, a computing device owned by the cellular network provider, a remote cloud-based server, etc.). For example, the computing device can automatically classify defects as business critical or not, and/or display an alert on the user interface 1800 to notify the user of any new business critical defects as they are reported. In some implementations, the computing device can also generate recommendations or action items for a user that can be presented on the user interface. For example, the computing device can generate a recommendation for a user to purchase software or hardware from particular vendors based on their history of defects. These generated recommendations can be presented on the user interface 1800.

Figure 19:
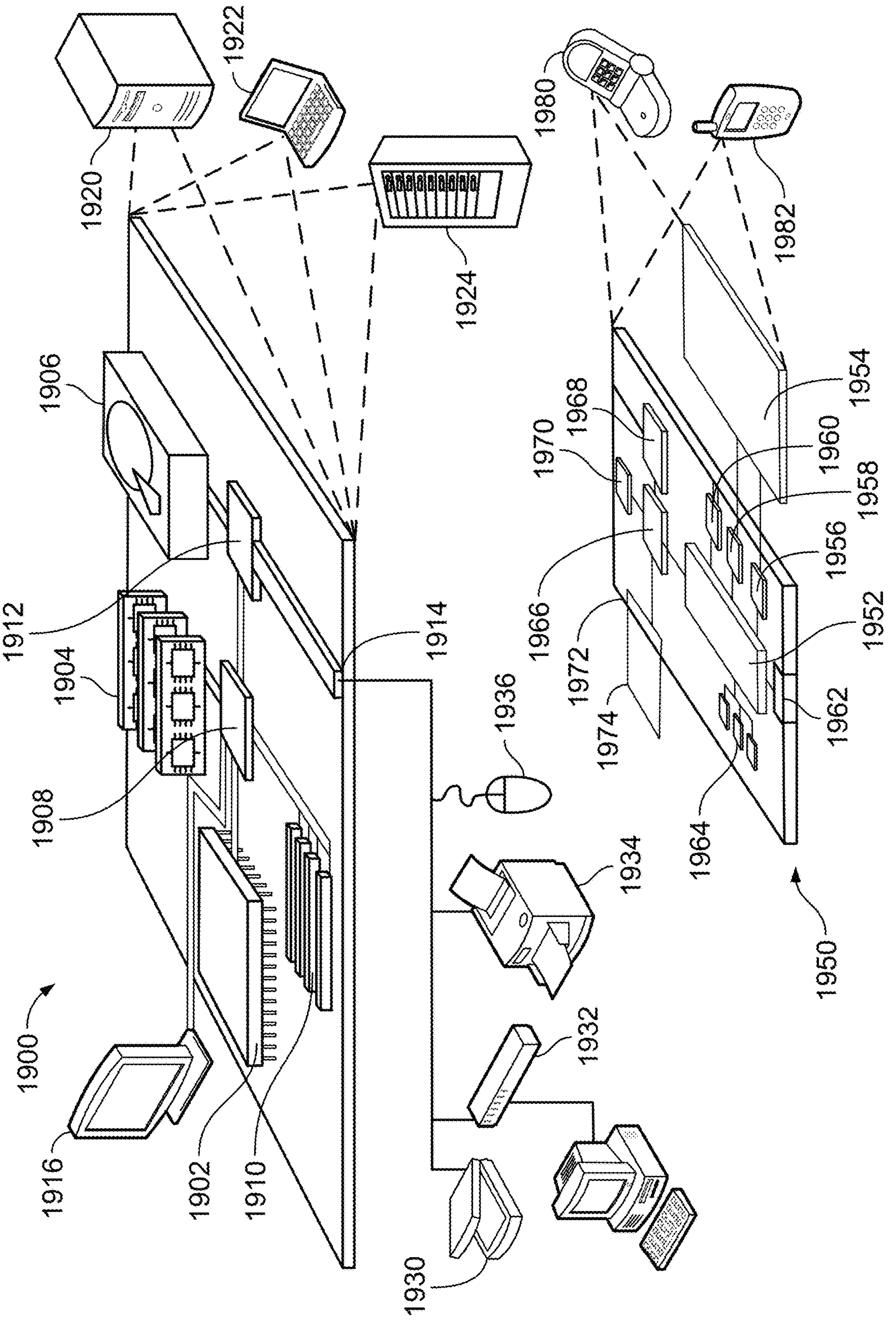
FIG. 19 is a diagram illustrating an example of a computing environment.

FIG. 19 shows an example of a computing device 1900 and a mobile computing device 1950 that are employed to execute implementations of the present disclosure. For example, the computing device 1900 and/or the mobile computing device 1950 can correspond to one or more devices employed to execute the process 200 such as devices of the cellular network (e.g., small cells or other wireless equipment) that collect data from cellular network-related workstreams (e.g., operation 202), servers that store the collected data (e.g., operation 204), devices utilized for correlating the collected data (e.g., operation 206), user devices configured to present user interfaces on a display (e.g., operation 208), etc.

The mobile computing device 1950 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 1900 includes a processor 1902, a memory 1904, a storage device 1906, a high-speed interface 1908, and a low-speed interface 1912. In some implementations, the high-speed interface 1908 connects to the memory 1904 and multiple high-speed expansion ports 1910. In some implementations, the low-speed interface 1912 connects to a low-speed expansion port 1914 and the storage device 1906. Each of the processor 1902, the memory 1904, the storage device 1906, the high-speed interface 1908, the high-speed expansion ports 1910, and the low-speed interface 1912, are interconnected using various buses, and may be mounted on a common motherboard or in other manners as appropriate. The processor 1902 can process instructions for execution within the computing device 1900, including instructions stored in the memory 1904 and/or on the storage device 1906 to display graphical information for a graphical user interface (GUI) on an external input/output device, such as a display 1916 coupled to the high-speed interface 1908. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 1904 stores information within the computing device 1900. In some implementations, the memory 1904 is a volatile memory unit or units. In some implementations, the memory 1904 is a non-volatile memory unit or units. The memory 1904 may also be another form of a computer-readable medium, such as a magnetic or optical disk.

The storage device 1906 is capable of providing mass storage for the computing device 1900. In some implementations, the storage device 1906 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 1902, perform one or more methods, such as those described above. The instructions can also be stored by one or more storage devices, such as computer-readable or machine-readable mediums, such as the memory 1904, the storage device 1906, or memory on the processor 1902.

The high-speed interface 1908 manages bandwidth-intensive operations for the computing device 1900, while the low-speed interface 1912 manages lower bandwidth-intensive operations. Such allocation of functions is an example only. In some implementations, the high-speed interface 1908 is coupled to the memory 1904, the display 1916 (e.g., through a graphics processor or accelerator), and to the high-speed expansion ports 1910, which may accept various expansion cards. In the implementation, the low-speed interface 1912 is coupled to the storage device 1906 and the low-speed expansion port 1914. The low-speed expansion port 1914, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 1914 through a network adapter. Such network input/output devices may include, for example, a switch or router.

The computing device 1900 may be implemented in a number of different forms, as shown in FIG. 19. For example, it may be implemented as a standard server 1920, or multiple times in a group of such servers. In addition, it may be implemented in a personal computer such as a laptop computer 1922. It may also be implemented as part of a rack server system 1924. Alternatively, components from the computing device 1900 may be combined with other components in a mobile device, such as a mobile computing device 1950. Each of such devices may contain one or more of the computing device 1900 and the mobile computing device 1950, and an entire system may be made up of multiple computing devices communicating with each other.

The mobile computing device 1950 includes a processor 1952; a memory 1964; an input/output device, such as a display 1954; a communication interface 1966; and a transceiver 1968; among other components. The mobile computing device 1950 may also be provided with a storage device, such as a micro-drive or other device, to provide additional storage. Each of the processor 1952, the memory 1964, the display 1954, the communication interface 1966, and the transceiver 1968, are interconnected using various buses, and several of the components may be mounted on a common motherboard or in other manners as appropriate. In some implementations, the mobile computing device 1950 may include a camera device(s).

The processor 1952 can execute instructions within the mobile computing device 1950, including instructions stored in the memory 1964. The processor 1952 may be implemented as a chipset of chips that include separate and multiple analog and digital processors. For example, the processor 1952 may be a Complex Instruction Set Computers (CISC) processor, a Reduced Instruction Set Computer (RISC) processor, or a Minimal Instruction Set Computer (MISC) processor. The processor 1952 may provide, for example, for coordination of the other components of the mobile computing device 1950, such as control of user interfaces (UIs), applications run by the mobile computing device 1950, and/or wireless communication by the mobile computing device 1950.

The processor 1952 may communicate with a user through a control interface 1958 and a display interface 1956 coupled to the display 1954. The display 1954 may be, for example, a Thin-Film-Transistor Liquid Crystal Display (TFT) display, an Organic Light Emitting Diode (OLED) display, or other appropriate display technology. The display interface 1956 may include appropriate circuitry for driving the display 1954 to present graphical and other information to a user. The control interface 1958 may receive commands from a user and convert them for submission to the processor 1952. In addition, an external interface 1962 may provide communication with the processor 1952, so as to enable near area communication of the mobile computing device 1950 with other devices. The external interface 1962 may provide, for example, for wired communication in some implementations, or for wireless communication in other implementations, and multiple interfaces may also be used.

The memory 1964 stores information within the mobile computing device 1950. The memory 1964 can be implemented as one or more of a computer-readable medium or media, a volatile memory unit or units, or a non-volatile memory unit or units. An expansion memory 1974 may also be provided and connected to the mobile computing device 1950 through an expansion interface 1972, which may include, for example, a Single in Line Memory Module (SIMM) card interface. The expansion memory 1974 may provide extra storage space for the mobile computing device 1950, or may also store applications or other information for the mobile computing device 1950. Specifically, the expansion memory 1974 may include instructions to carry out or supplement the processes described above, and may include secure information also. Thus, for example, the expansion memory 1974 may be provided as a security module for the mobile computing device 1950, and may be programmed with instructions that permit secure use of the mobile computing device 1950. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 1952, perform one or more methods, such as those described above. The instructions can also be stored by one or more storage devices, such as one or more computer-readable or machine-readable mediums, such as the memory 1964, the expansion memory 1974, or memory on the processor 1952. In some implementations, the instructions can be received in a propagated signal, such as, over the transceiver 1968 or the external interface 1962.

The mobile computing device 1950 may communicate wirelessly through the communication interface 1966, which may include digital signal processing circuitry where necessary. The communication interface 1966 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 1968 using a radio frequency. In addition, short-range communication, such as using a Bluetooth or Wi-Fi, may occur. In addition, a Global Positioning System (GPS) receiver module 1970 may provide additional navigation- and location-related wireless data to the mobile computing device 1950, which may be used as appropriate by applications running on the mobile computing device 1950.

The mobile computing device 1950 may also communicate audibly using an audio codec 1960, which may receive spoken information from a user and convert it to usable digital information. The audio codec 1960 may likewise generate audible sound for a user, such as through a speaker, e.g., in a handset of the mobile computing device 1950. Such sound may include sound from voice telephone calls, may include recorded sound (e.g., voice messages, music files, etc.) and may also include sound generated by applications operating on the mobile computing device 1950.

The mobile computing device 1950 may be implemented in a number of different forms, as shown in FIG. 19. For example, it may be implemented a phone device 1980, a personal digital assistant 1982, and a tablet device (not shown). The mobile computing device 1950 may also be implemented as a component of a smart-phone, AR device, or other similar mobile device.

Computing device 1900 and/or 1950 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:

collecting data from a plurality of workstreams relating to maintaining, operating, or building a cellular network;

storing the collected data in a centralized repository;

correlating the collected data from at least two workstreams of the plurality of workstreams, wherein the plurality of workstreams comprise selection and/or installation of wireless sites, monitoring performance of the cellular network, monitoring user sessions on the cellular network, implementing software updates on the cellular network, and/or monitoring productivity of one or more employees of a provider of the cellular network, wherein the at least two workstreams comprise the implementing software updates workstream and the monitoring performance of the cellular network workstream, wherein correlating the collected data from the at least two workstreams of the plurality of workstreams comprises correlating the collected data based on a common data field included in the collected data from each of the at least two workstreams, wherein the common data field comprises a wireless site identifier, and wherein the correlated data is aggregated within a cloud-native 5G centralized repository and comprises information about a plurality of software versions and signal quality metrics comprising at least one of Signal to Interface and Noise Ratio (SINR) or throughput metrics;

automatically comparing the signal quality metrics of one software version of the plurality of software versions with another software version of the plurality of software versions to identify a software performance deviation relative to a predefined threshold; and presenting, on a display of a user device, a user interface comprising a visualization of the comparison, and automatically presenting an alert identifying a specific wireless site associated with the software performance deviation.

2. The method of claim 1, wherein the centralized repository comprises a data lake.

3. The method of claim 1, wherein presenting the user interface comprises:

receiving a user selection of one or more data fields, and determining, based on the user selection, a type of the visualization for presenting on the display.

4. The method of claim 1, wherein the correlated data comprises user session data and network health data, and wherein the method further comprises determining, based on the visualization, a reason that a particular call was dropped.

5. The method of claim 1, wherein the correlated data comprises information about a productivity of staff members, wherein the visualization shows utilization rates of the staff members, and wherein the method further comprises automatically presenting, on the display of the user device, an alert that the utilization rates of the staff members have fallen below a pre-defined threshold level.

6. The method of claim 1, wherein the correlated data comprises information about a rollout of a software upgrade on the cellular network, wherein the visualization shows an indicator of progress of the rollout of the software upgrade on the cellular network, and wherein the method further comprises automatically presenting, on the display of the user device, an alert that the rollout of the software upgrade on the cellular network is behind a planned timeline for the rollout of the software upgrade on the cellular network.

7. The method of claim 1, wherein the correlated data comprises information about a development status of a wireless site being developed for integration into the cellular network, wherein the visualization shows an indicator of the development status, and wherein the method further comprises:

automatically determining that the development status of the wireless site has progressed to a certain stage, and in response to determining that the development status of the wireless site has progressed to the certain stage, presenting on the display of the user device a recommendation to transmit a communication to an identified party to initiate a subsequent stage of wireless site development.

8. The method of claim 1, wherein the correlated data comprises information about one or more versions of software being implemented across the cellular network, wherein the visualization shows an indicator of the one or more versions of software being implemented across the cellular network, and wherein the method further comprises automatically presenting, on the display of the user device, an alert that a predominant software version of the one or more versions of software being implemented across the cellular network is implemented in a percentage of wireless sites of the cellular network that is below a pre-defined threshold.

9. The method of claim 1, wherein the correlated data comprises information about one or more wireless sites of the cellular network, and wherein the visualization shows an indicator of performance characteristics and/or failure reasons of the one or more wireless sites of the cellular network.

10. The method of claim 9, wherein the one or more wireless sites of the cellular network are dark sites of the cellular network.

11. The method of claim 9, further comprising automatically presenting, on the display of the user device, an alert that a number or proportion of the one or more wireless sites that are down has exceeded a pre-defined threshold level.

12. The method of claim 1, wherein the correlated data comprises information about one or more wireless sites of the cellular network and one or more computer clusters, and wherein the visualization shows an indication of which of the one or more computer clusters are utilized by each of the one or more wireless sites of the cellular network.

13. The method of claim 1, wherein the correlated data comprises information about one or more wireless sites of the cellular network and a progress of a traffic shaping upgrade for the one or more wireless sites, and wherein the visualization shows an indicator of the progress of the traffic shaping upgrade for one or more geographic areas.

14. The method of claim 1, wherein the correlated data comprises information about performance characteristics and locations of one or more wireless sites of the cellular network, wherein the visualization shows an indicator of progress for a performance-related optimization process for the one or more wireless sites, and wherein the method further comprises automatically presenting, on the display of the user device, an indication that a percentage of the one or more wireless sites of the cellular network that have been optimized exceeds a pre-defined threshold.

15. The method of claim 1, wherein the correlated data comprises information about server models utilized at one or more wireless sites of the cellular network, wherein the visualization shows an indicator of progress for a server swapping process for the one or more wireless sites, and wherein the method further comprises automatically presenting, on the display of the user device, an indication that a percentage of the one or more wireless sites where a server swap has been completed exceeds a pre-defined threshold.

16. The method of claim 1, wherein the correlated data comprises information about one or more defects associated with vendor-provided software and/or hardware that is deployed on the cellular network, and wherein the visualization shows an indication of a status of the one or more defects associated with the vendor-provided software and/or hardware that is deployed on the cellular network.

17. A computing system comprising:

a centralized repository that stores data from a plurality of workstreams relating to maintaining, operating, or building a cellular network, wherein the plurality of workstreams comprise selection and/or installation of wireless sites, monitoring performance of the cellular network, monitoring user sessions on the cellular network, implementing software updates on the cellular network, and/or monitoring productivity of one or more employees of a provider of the cellular network;

a user device comprising a display;

a memory configured to store instructions; and one or more processors configured to execute the instructions to perform operations comprising:

correlating the collected data from at least two workstreams of the plurality of workstreams, wherein the at least two workstreams comprise the implementing software updates workstream and the monitoring performance of the cellular network workstream, wherein correlating the collected data from the at least two workstreams of the plurality of workstreams comprises correlating the collected data based on a common data field included in the collected data from each of the at least two workstreams, wherein the common data field comprises a wireless site identifier, and wherein the correlated data is aggregated within a cloud-native 5G centralized repository and comprises information about a plurality of software versions and signal quality metrics comprising at least one of Signal to Interface and Noise Ratio (SINR) or throughput metrics;

automatically comparing the signal quality metrics of one software version of the plurality of software versions with another software version of the plurality of software versions to identify a software performance deviation relative to a predefined threshold; and presenting, on the display of the user device, a user interface comprising a visualization of the comparison, and automatically presenting an alert identifying a specific wireless site associated with the software performance deviation.

18. The computing system of claim 17, wherein the centralized repository comprises a data lake and wherein the common data field comprises a wireless site identifier.

19. The computing system of claim 17, wherein the correlated data comprises information about one or more versions of software being implemented across the cellular network, wherein the visualization shows an indicator of the one or more versions of software being implemented across the cellular network, and wherein the operations further comprise automatically presenting, on the display of the user device, an alert that a predominant software version of the one or more versions of software being implemented across the cellular network is implemented in a percentage of wireless sites of the cellular network that is below a pre-defined threshold.

20. The computing system of claim 17, wherein the correlated data comprises information about one or more wireless sites of the cellular network, and wherein the visualization shows an indicator of performance characteristics and/or failure reasons of the one or more wireless sites of the cellular network.

* * * * *